US012697969B2

(12) United States Patent
Okonogi

(10) Patent No.: US 12,697,969 B2
(45) Date of Patent: Aug. 4, 2026

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventor: Fumito Okonogi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 859 days.

(21) Appl. No.: 17/787,142

(22) PCT Filed: Dec. 15, 2020

(86) PCT No.: PCT/JP2020/046735
§ 371 (c)(1),
(2) Date: Jun. 17, 2022

(87) PCT Pub. No.: WO2021/125163
PCT Pub. Date: Jun. 24, 2021

(65) Prior Publication Data
US 2023/0021000 A1      Jan. 19, 2023

(30) Foreign Application Priority Data
Dec. 18, 2019      (JP) ................................. 2019-227937

(51) Int. Cl.
*B60W 30/14*          (2006.01)
*B60W 10/18*          (2012.01)
(Continued)

(52) U.S. Cl.
CPC .......... *B60W 30/143* (2013.01); *B60W 10/18* (2013.01); *B60W 10/20* (2013.01); (Continued)

(58) Field of Classification Search
CPC ............... B60W 30/143; B60W 30/16; B60W 30/0956; B60W 30/18163; B60W 10/18; B60W 10/20; B60W 10/04; B60W 40/04
See application file for complete search history.

(56) References Cited

U.S. PATENT DOCUMENTS 10,089,876 B1 * 10/2018 Ramasamy ............ G05D 1/028
2018/0157257 A1 * 6/2018 Hashimoto ........ B62D 15/0255
(Continued)

FOREIGN PATENT DOCUMENTS

JP          2003-72415 A      3/2003
JP          2003072415 A  *  3/2003
(Continued)

OTHER PUBLICATIONS

International Preliminary Report on Patentability (PCT/IB/326, PCT/IB/338 & PCT/IB/373) issued in PCT Application No. PCT/JP2020/046735 dated Jun. 30, 2022, including English translation of document C2 (Japanese-language Written Opinion (PCT/ISA/237), filed on Jun. 17, 2022) (seven (7) pages).
(Continued)

*Primary Examiner* — David P. Merlino
*Assistant Examiner* — Mahmoud M Kazimi
(74) *Attorney, Agent, or Firm* — Crowell & Moring LLP

(57)          ABSTRACT

A vehicle control device, a vehicle control method, and a vehicle control system according to the present invention obtain an inter-vehicle time based on a relative distance between a first vehicle traveling, in front of an own vehicle, in a second lane adjacent to a first lane in which the own vehicle travels and a second vehicle traveling in the second lane in front of the first vehicle and based on a relative velocity of the first vehicle relative to the second vehicle, obtain a relative acceleration of the first vehicle relative to the second vehicle, set the first vehicle as a high-stress
(Continued)

ADJACENT          OWN LANE      ADJACENT
LEFT LANE         (FIRST LANE)  RIGHT LANE
(SECOND LANE)                   (THIRD LANE)

vehicle based on a lane change space that is based on the inter-vehicle time, the relative acceleration, and a relative distance between the second vehicle and a third vehicle traveling in the first lane in front of the own vehicle, and output a control command for changing a driving state of the own vehicle based on a relative distance between the high-stress vehicle and the own vehicle. This makes it possible to improve the driving safety of a vehicle on a road with multiple lanes in each direction.

10 Claims, 14 Drawing Sheets

(51) Int. Cl.
| | |
|---|---|
| *B60W 10/20* | (2006.01) |
| *B60W 30/095* | (2012.01) |
| *B60W 30/16* | (2020.01) |
| *B60W 30/18* | (2012.01) |
| *B60W 40/04* | (2006.01) |

(52) U.S. Cl.
CPC ........ *B60W 30/0956* (2013.01); *B60W 30/16* (2013.01); *B60W 40/04* (2013.01); *B60W 2554/4041* (2020.02); *B60W 2554/4045* (2020.02); *B60W 2554/80* (2020.02)

(56) References Cited

U.S. PATENT DOCUMENTS

| | | | | |
|---|---|---|---|---|
| 2021/0284153 A1* | 9/2021 | Baek | ..................... | B60W 30/16 |
| 2023/0092364 A1* | 3/2023 | Kondo | ........... | B60W 60/00274 |
| | | | | 701/23 |

FOREIGN PATENT DOCUMENTS

| | | |
|---|---|---|
| JP | 2012-155535 A | 8/2012 |
| JP | 2014-203399 A | 10/2014 |
| WO | WO 2014/054171 A1 | 4/2014 |

OTHER PUBLICATIONS

International Search Report (PCT/ISA/210) issued in PCT Application No. PCT/JP2020/046735 dated Mar. 2, 2021 with English translation (four (4) pages).
Japanese-language Written Opinion (PCT/ISA/237) issued in PCT Application No. PCT/JP2020/046735 dated Mar. 2, 2021 (four (4) pages).

* cited by examiner

VEHICLE CONTROL DEVICE, VEHICLE CONTROL METHOD, AND VEHICLE CONTROL SYSTEM

TECHNICAL FIELD

The present invention relates to a vehicle control device, to a vehicle control method, and to a vehicle control system.

BACKGROUND ART

Patent Document 1 describes a vehicle driving control device for a vehicle that, when another vehicle traveling in an adjacent lane is present within a first predetermined distance from the vehicle, calculates an inter-vehicle distance between the vehicle and a leading vehicle in front of the vehicle. When determining that the inter-vehicle distance is less than a second predetermined distance, the vehicle driving control device performs control to suppress acceleration of the vehicle.

REFERENCE DOCUMENT LIST

Patent Document

Patent Document 1: JP 2003-72415 A

SUMMARY OF THE INVENTION

Problem to be Solved by the Invention

Here, when a leading vehicle traveling in the same lane as a vehicle is present at a close distance in front of the vehicle, a vehicle traveling in an adjacent lane cannot always make a lane change to the lane of the vehicle, and a vehicle that attempted to, but was unable to, make a lane change to the lane of the vehicle gets stressed and may affect the driving safety of the vehicle itself.

The present invention was made in view of the problems in the related art, and an object of the present invention is to provide a vehicle control device, a vehicle control method, and a vehicle control system than can improve driving safety of a vehicle on a road with multiple lanes in each direction.

Means for Solving the Problem

An aspect of the present invention includes obtaining an inter-vehicle time based on a relative distance between a first vehicle traveling, in front of an own vehicle, in a second lane adjacent to a first lane in which the own vehicle travels and a second vehicle traveling in the second lane in front of the first vehicle and based on a relative velocity of the first vehicle relative to the second vehicle; obtaining a relative acceleration of the first vehicle relative to the second vehicle; setting the first vehicle as a high-stress vehicle based on a lane change space that is based on the inter-vehicle time, the relative acceleration, and a relative distance between the second vehicle and a third vehicle traveling in the first lane in front of the own vehicle; and outputting a control command for changing a driving state of the own vehicle based on a relative distance between the high-stress vehicle and the own vehicle.

Effects of the Invention

The present invention makes it possible to improve the driving safety of a vehicle on a road with multiple lanes in each direction.

MODE FOR CARRYING OUT THE INVENTION

A vehicle control device, a vehicle control method, and a vehicle control system according to an embodiment of the present invention are described below with reference to the drawings.

The embodiment described below is based on the assumption that automobiles are traveling on a road in Japan where drivers keep to the left.

Figure 1:
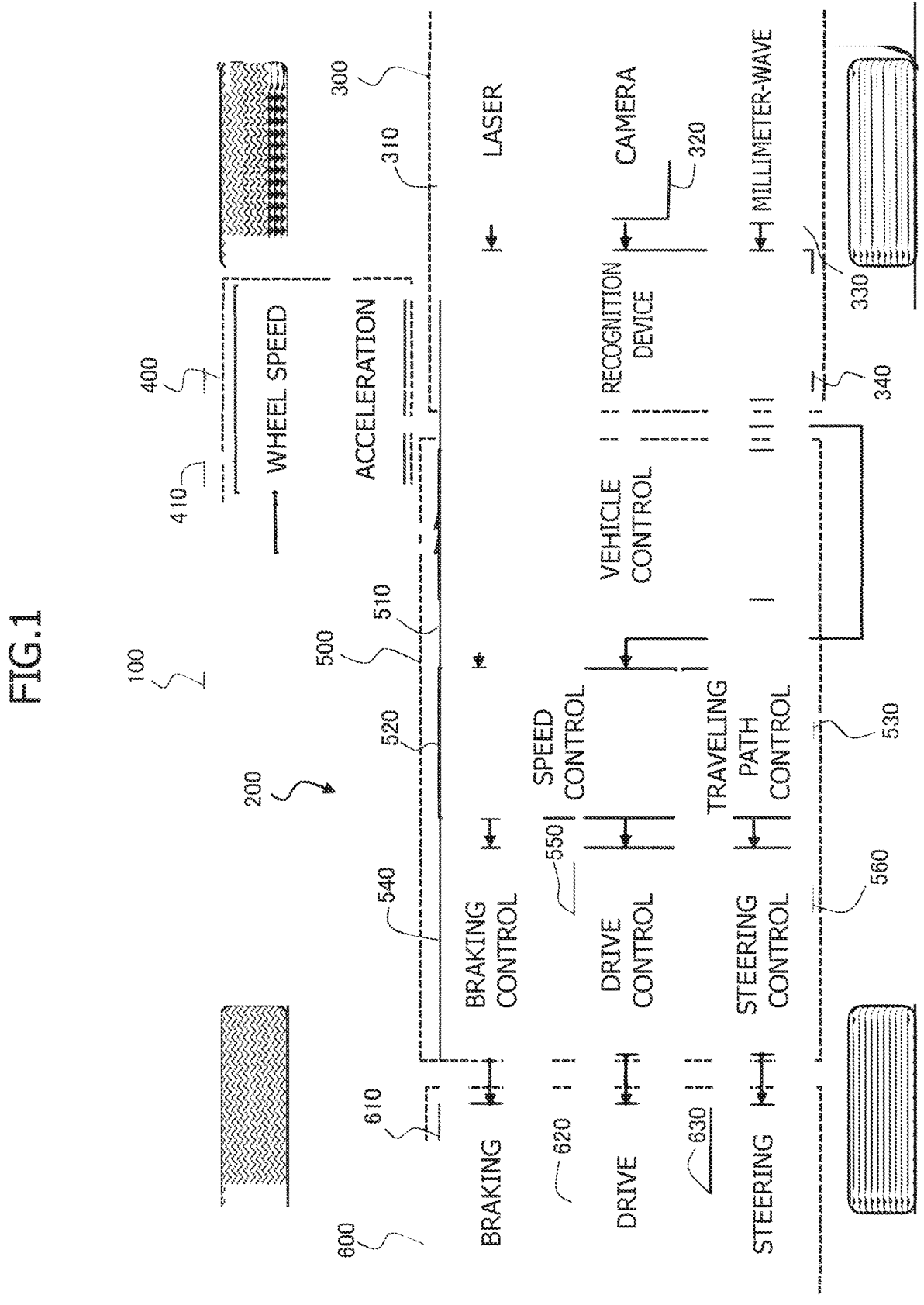
FIG. 1 is a block diagram illustrating a vehicle control system according to an embodiment.

FIG. 1 is a block diagram illustrating a vehicle control system 200 according to an embodiment, which is provided in a vehicle 100 that is an automobile.

Vehicle control system 200 enables automated driving of vehicle 100 and electronically controls the braking-driving force and the steering angle of vehicle 100.

Vehicle control system 200 includes a surrounding environment recognition unit 300, a driving state detection unit 400, a control unit 500, and an actuator unit 600.

Surrounding environment recognition unit 300 (external recognition unit) includes a laser scanning device 310, a camera device 320, a millimeter-wave radar device 330, and a surrounding environment recognition device 340.

Laser scanning device 310 is disposed on vehicle 100 so as to be able to scan the surroundings of vehicle 100, and obtains information such as relative positions, relative velocities, and relative accelerations, which are relative to vehicle 100, of other vehicles (which are hereafter referred to as "nearby vehicles") traveling around vehicle 100.

Surrounding environment recognition device 340 assigns identification codes ID to nearby vehicles recognized based on information from laser scanning device 310, and constructs a database that is a collection of tracking data of the respective nearby vehicles to which the identification codes ID are assigned.

Here, surrounding environment recognition device 340 can improve the accuracy of the tracking data of the nearby vehicles by also using surrounding recognition information from camera device 320 and millimeter-wave radar device 330.

Also, surrounding environment recognition device 340 recognizes driving lanes around vehicle 100 based on information on white lines of a road recognized by laser scanning device 310 and/or camera device 320, the position of vehicle 100, and map information.

Driving state detection unit 400 includes multiple sensors that detect the driving state of vehicle 100. For example, driving state detection unit 400 includes a wheel speed sensor 410 for detecting the rotational speed of each wheel of vehicle 100 and an acceleration sensor 420 for detecting the longitudinal acceleration and the lateral acceleration of vehicle 100.

Wheel speed sensor 410 outputs wheel-speed signals to control unit 500, and acceleration sensor 420 outputs an acceleration signals to control unit 500.

Control unit 500 includes a vehicle control device 510, a speed control device 520, a traveling path control device 530, a braking control device 540 (brake control device), a drive control device 550 (powertrain control device), and a steering control device 560.

Each of control devices 510-560 constituting control unit 500 is an electronic control device mainly composed of a microcomputer that performs calculations based on input information and outputs calculation results. The microcomputer includes a microprocessor unit (MPU), a read-only memory (ROM), and a random-access memory (RAM).

Actuator unit 600 includes a braking device 610, a drive device 620, and a steering device 630.

Braking device 610 can electronically control the braking force of vehicle 100 by, for example, controlling an electronically controlled electro-hydraulic brake including an actuator for generating hydraulic pressure.

Drive device 620 is, for example, an internal-combustion engine or an electric motor that generates the driving force of vehicle 100, and can electronically control the driving force of vehicle 100.

Steering device 630 is, for example, an electronic power steering device or a steer-by-wire system that can electronically control the steering angle of the steering wheel of vehicle 100 using a steering actuator such as an electric motor.

Vehicle control device 510, which functions as a control unit or a controller that outputs a control command for changing the driving state of vehicle 100 (own vehicle), obtains various detection signals output by driving state detection unit 400, and also obtains information on a tracking database constructed by surrounding environment recognition device 340.

Also, vehicle control device 510 determines a control command (driving action command) for changing the driving state of vehicle 100 based on the obtained information, and outputs the determined control command to speed control device 520 or traveling path control device 530.

When no command is obtained from vehicle control device 510, speed control device 520 calculates a target acceleration necessary to follow a vehicle (leading vehicle) traveling ahead based on the information on the tracking database obtained from surrounding environment recognition device 340 and a set target inter-vehicle time.

Here, an inter-vehicle time indicates a time necessary to travel an inter-vehicle distance with the current vehicle speed.

Also, when a command is obtained from vehicle control device 510, speed control device 520 calculates a target acceleration according to a follow-target vehicle and a target inter-vehicle time that are based on the obtained command.

Then, speed control device 520 appropriately distributes the calculated target acceleration to a braking control command and a drive control command, outputs the braking control command to braking control device 540, and outputs the drive control command to drive control device 550.

Braking control device 540 controls braking device 610 based on the braking control command obtained from speed control device 520 to generate a braking force corresponding to the braking control command.

Also, drive control device 550 controls drive device 620 based on the drive control command obtained from speed control device 520 to generate a driving force corresponding to the drive control command.

When no command is obtained from vehicle control device 510, traveling path control device 530 calculates a target traveling path of vehicle 100 based on, for example, lane recognition information from surrounding environment recognition device 340, and obtains a target steering angle for causing vehicle 100 to follow the calculated target traveling path.

Also, when a command is obtained from vehicle control device 510, traveling path control device 530 calculates a target traveling path for causing vehicle 100 to make a lane change to an adjacent lane and obtains a target steering angle to cause vehicle 100 to follow the calculated target traveling path.

Then, traveling path control device 530 outputs a steering control command corresponding to the obtained target steering angle to steering control device 560.

Steering control device 560 controls steering device 630 based on the steering control command obtained from traveling path control device 530 to control the steering angle of vehicle 100 to match the target steering angle corresponding to the steering control command.

Next, a process of calculating a control command using a tracking database by vehicle control device 510 is described in detail.

Figure 2:
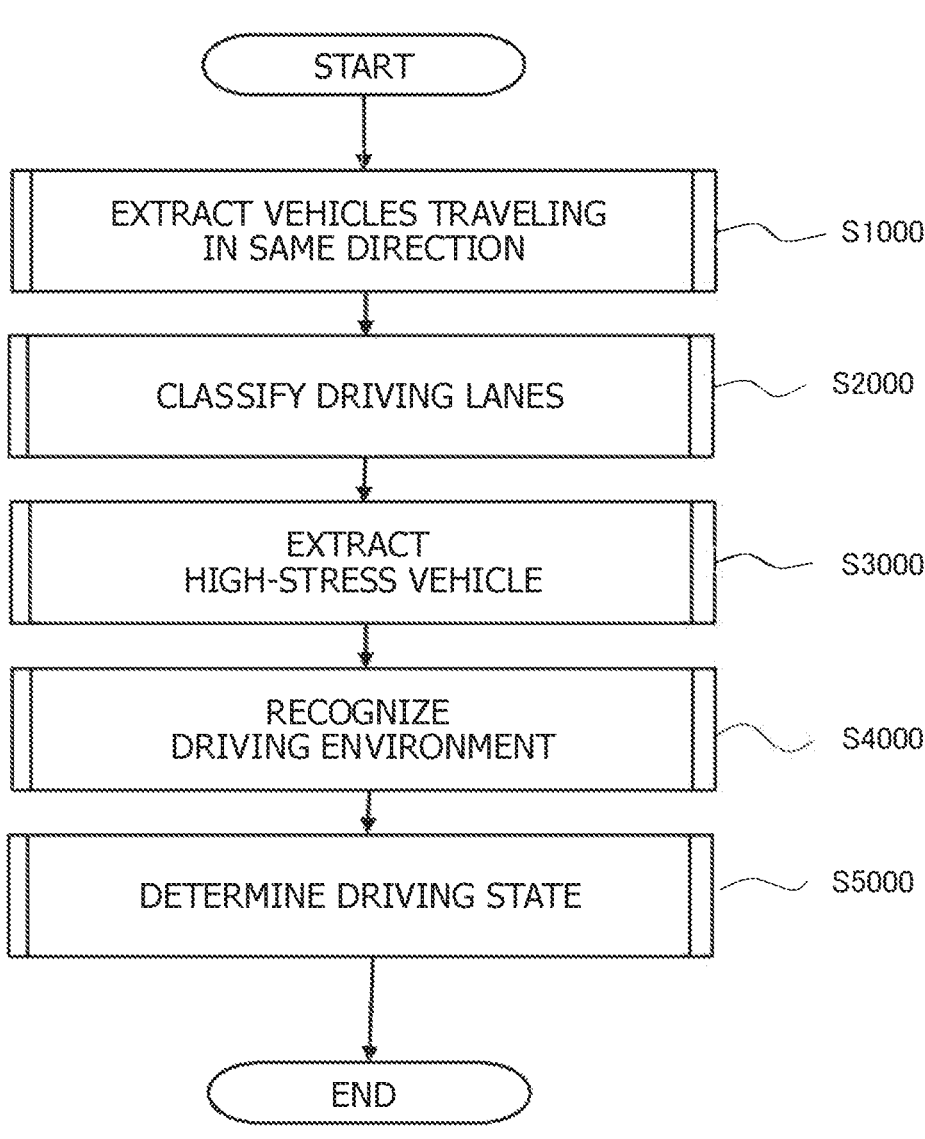
FIG. 2 is a flowchart illustrating a main routine of a process of calculating a driving action command.

FIG. 2 is a flowchart illustrating a main routine of a process of calculating a control command by vehicle control device 510.

At step S1000, vehicle control device 510 performs a process of assigning an identification code to tracking data of vehicles traveling in the same direction as vehicle 100 among information on nearby vehicles obtained from a tracking database to indicate that the vehicles are traveling in the same direction as vehicle 100, i.e., a process of extracting vehicles traveling in the same direction as vehicle 100.

Here, vehicle control device 510 determines whether a nearby vehicle is traveling in the same direction as vehicle 100 by, for example, comparing an angle between the velocity vector of a subject vehicle (in other words, a vehicle that is the subject of attention) and the velocity vector of vehicle 100 with a predetermined threshold.

Next, at step S2000, vehicle control device 510 classifies driving lanes of the vehicles that are traveling in the same direction as vehicle 100 and selected at step S1000.

Here, based on the relative lateral position between each subject vehicle for which a driving lane is to be classified and vehicle 100, vehicle control device 510 classifies the driving lane of the subject vehicle into one of an adjacent right lane, an adjacent left lane, an "own lane", and "other" (unclassified).

When vehicle control device 510 includes a map database including lane information or there is an external data server accessible via a radio communication unit, vehicle control device 510 may determine the travel directions of nearby vehicles and classify driving lanes by referring to the map database or the data server.

An "own lane" is a lane (first lane) in which vehicle 100 itself is traveling, an adjacent right lane is a lane located to the right of the own lane, and an adjacent left lane is a lane located to the left of the own lane.

Also, other lanes (unclassified lanes) are lanes that are neither an own lane (first lane) nor an adjacent lane (second lane) adjacent to the own lane. For example, when the own lane is the leftmost lane in a road with three lanes in each direction, the rightmost lane is classified as "other".

As described later, vehicle control device 510 includes a function for outputting a control command for changing the driving state of vehicle 100 to make way for a vehicle traveling in a lane adjacent to the own lane according to driving states of nearby vehicles traveling in the own lane and adjacent lanes.

However, because vehicle control device 510 does not perform a process of changing the driving state of vehicle 100 according to nearby vehicles traveling in other lanes excluding the own lane and the adjacent lanes, the other lanes are collectively classified as "other" in terms of lane classification.

Next, at step S3000, vehicle control device 510 performs a process of setting a vehicle (first vehicle) traveling in front of vehicle 100 in an adjacent right lane or an adjacent left lane as a high-stress vehicle, in other words, a process of extracting a high-stress vehicle.

Here, a high-stress vehicle indicates a vehicle that attempts to, but is unable to, make a lane change from the adjacent right lane or the adjacent left lane to the own lane because there is not sufficient space to make a lane change.

Vehicle control device 510 obtains information on an inter-vehicle time based on a relative distance between a first vehicle traveling in front of vehicle 100 in an adjacent right lane or an adjacent left lane (second lane) adjacent to the own lane (first lane) and a second vehicle traveling in front of the first vehicle in the same lane as the first vehicle and a relative velocity of the first vehicle relative to the second vehicle, and also obtains information on a relative acceleration of the first vehicle relative to the second vehicle.

Then, vehicle control device 510 designates the first vehicle as a high-stress vehicle on the basis of the inter-vehicle time, the relative acceleration, and a lane change space that is based on a relative distance between the second vehicle and a third vehicle traveling in front of vehicle 100 in the own lane.

That is, vehicle control device 510 detects, from vehicles (first vehicles) traveling in front of vehicle 100 in the adjacent right lane or the adjacent left lane, a vehicle that has generated a deceleration greater than or equal to a predetermined value within a predetermined range from a leading vehicle (second vehicle) in front of that vehicle; and if there is not sufficient space for the detected vehicle to make a lane change to the own lane, vehicle control device 510 designates the detected vehicle as a high-stress vehicle by setting a determination result indicating that the detected vehicle is a high-stress vehicle in the tracking data of the detected vehicle.

Next, at step S4000, vehicle control device 510 performs a process of recognizing the driving environment of vehicle 100.

At step S4000, vehicle control device 510 extracts, from high-stress vehicles, a high-stress vehicle that is present in front of vehicle 100 in a predetermined area in the adjacent right lane or the adjacent left lane and the speed of which is lower than the speed of a leading vehicle being followed by vehicle 100.

Then, vehicle control device 510 calculates a tracking data ID of the leading vehicle in front of the extracted high-stress vehicle and an inter-vehicle time between the extracted high-stress vehicle and vehicle 100, and sets an inter-vehicle time adjustment request (speed adjustment request) to make way for the high-stress vehicle.

However, when the distance between vehicle 100 and a vehicle (trailing vehicle) behind vehicle 100 is less than a predetermined value and the deceleration of vehicle 100 is likely to influence the driving of the trailing vehicle and when vehicle 100 can make a lane change to a passing lane (adjacent right lane), vehicle control device 510 sets a lane change request, instead of the inter-vehicle time adjustment request, to make way for the high-stress vehicle.

At next step S5000, vehicle control device 510 integrates inter-vehicle time adjustment requests or lane change requests that are related to high-stress vehicles and obtained at step S4000 and selects an inter-vehicle time adjustment or a lane change as the driving action of vehicle 100.

Then, vehicle control device 510 outputs a control command to speed control device 520 or traveling path control device 530 based on the selected driving action.

Details of processes at steps S1000 through S5000 are described below.

Figure 3:
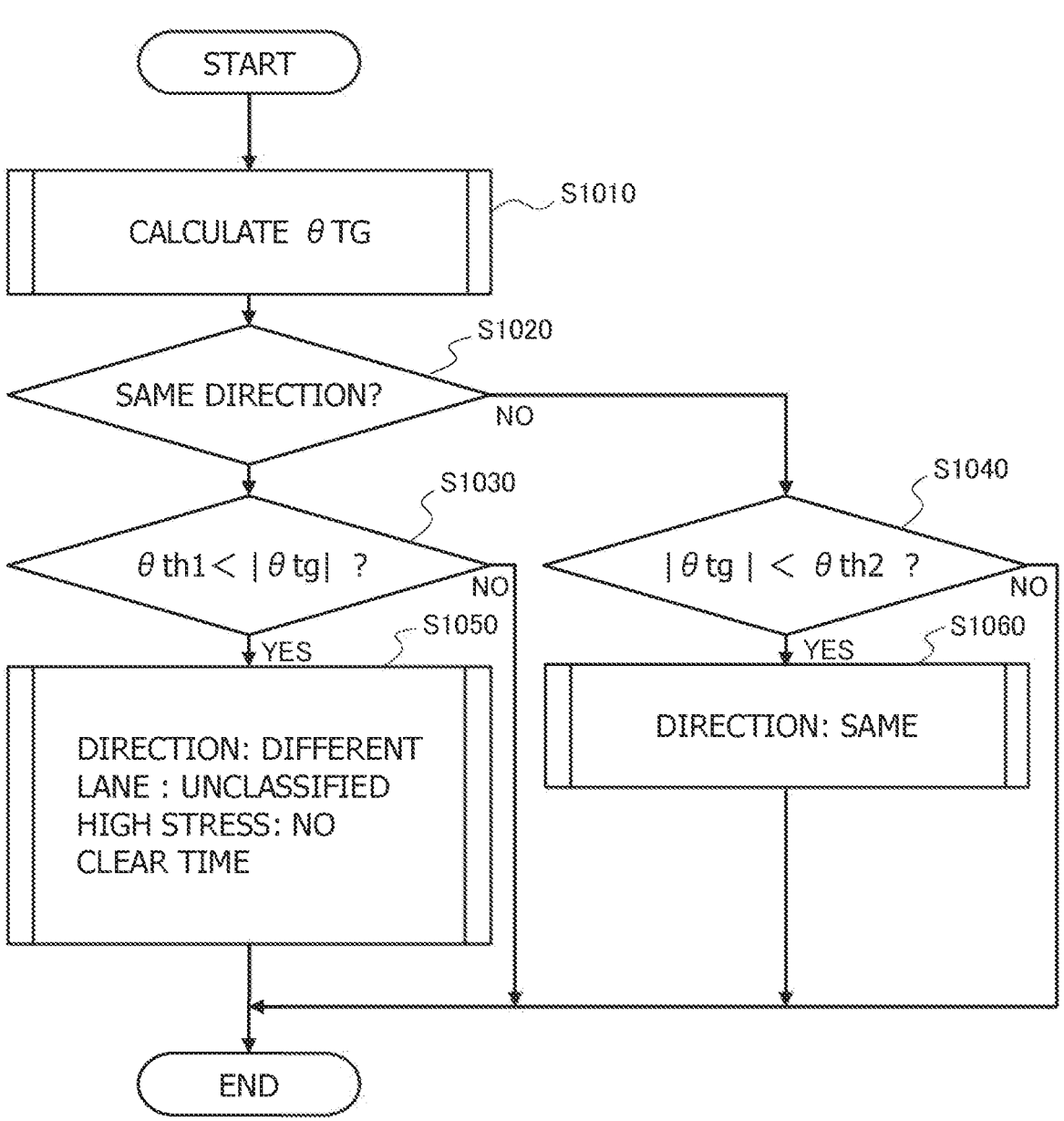
FIG. 3 is a flowchart illustrating a process of determining the travel direction of a nearby vehicle.

FIG. 3 is a flowchart illustrating the details of the process at step S1000 in FIG. 2, i.e., the process of extracting nearby vehicles traveling in the same direction as vehicle 100.

Here, at step S1000, vehicle control device 510 performs the same process on all sets of nearby vehicle data in the tracking database.

First, at step S1010, vehicle control device 510 calculates, according to formula 1, an angle $\theta_{tg}$ [deg] between the velocity vector of vehicle 100 and the velocity vector of a subject vehicle (vehicle on which attention is focused) that is selected from nearby vehicles and on which a travel direction determination process is to be performed.

In Formula 1, the velocity vector of vehicle 100 is represented by vector Vego, and the velocity vector of the subject vehicle is represented by vector Vtg.

$$\theta_{tg} = \cos^{-1}\left(\frac{\overrightarrow{V_{ego}} \cdot \overrightarrow{V_{tg}}}{|\overrightarrow{V_{ego}}||\overrightarrow{V_{tg}}|}\right) \qquad \text{[Formula 1]}$$

Next, at step S1020, vehicle control device 510 determines whether a determination result indicating that the subject vehicle is traveling in the same direction as vehicle 100 is set for the subject vehicle.

When a determination result indicating that the subject vehicle is not traveling in the same direction as vehicle 100 is set, in other words, when a determination result indicating that the subject vehicle is traveling in a direction different from vehicle 100 is set, vehicle control device 510 proceeds to step S1040.

At step S1040, vehicle control device 510 determines whether the absolute value of the angle θtg obtained at step S1010 is less than a second predetermined angle θth2 (θth2>0).

Here, when the absolute value of the angle θtg is less than the second predetermined angle θth2, vehicle control device 510 proceeds to step S1060 to set a determination result indicating that the subject vehicle is traveling in the same direction as vehicle 100, and ends the process.

On the other hand, when the absolute value of the angle θtg is greater than or equal to the second predetermined angle θth2, vehicle control device 510 bypasses step S1060 and ends the process so as not to set, in the tracking data of the subject vehicle, a determination result indicating that the subject vehicle is traveling in the same direction as vehicle 100.

That is, when determining at step S1040 that the absolute value of the angle θtg is greater than or equal to the second predetermined angle θth2, vehicle control device 510 determines that the subject vehicle is traveling in a direction different from vehicle 100 as in the previous determination.

When determining, at step S1020, that a determination result indicating that the subject vehicle is traveling in the same direction as vehicle 100 is set, vehicle control device 510 proceeds to step S1030.

Then, at step S1030, vehicle control device 510 determines whether the absolute value of the angle θtg obtained at step S1010 is greater than a first predetermined angle θth1 (θth1>θth2>0).

When the absolute value of the angle θtg is greater than the first predetermined angle θth1, vehicle control device 510 proceeds to step S1050 and sets, in the tracking data of the subject vehicle, a determination result indicating that the subject vehicle is traveling in a direction different from vehicle 100.

Also, at step S1050, vehicle control device 510 sets driving lane information of the subject vehicle to "unclassified" and cancels the determination result indicating that the subject vehicle is a high-stress vehicle. Furthermore, vehicle control device 510 clears a detection time Ths, at which the subject vehicle was determined as a high-stress vehicle, and ends the process.

On the other hand, when the absolute value of the angle θtg is less than or equal to the first predetermined angle θth1, vehicle control device 510 bypasses step S1050 and ends the process to retain the determination result indicating that the subject vehicle is traveling in the same direction as vehicle 100 and to also retain the driving lane information, the result of determining the high-stress vehicle, and the detection time Ths of the high-stress vehicle.

Figure 4:
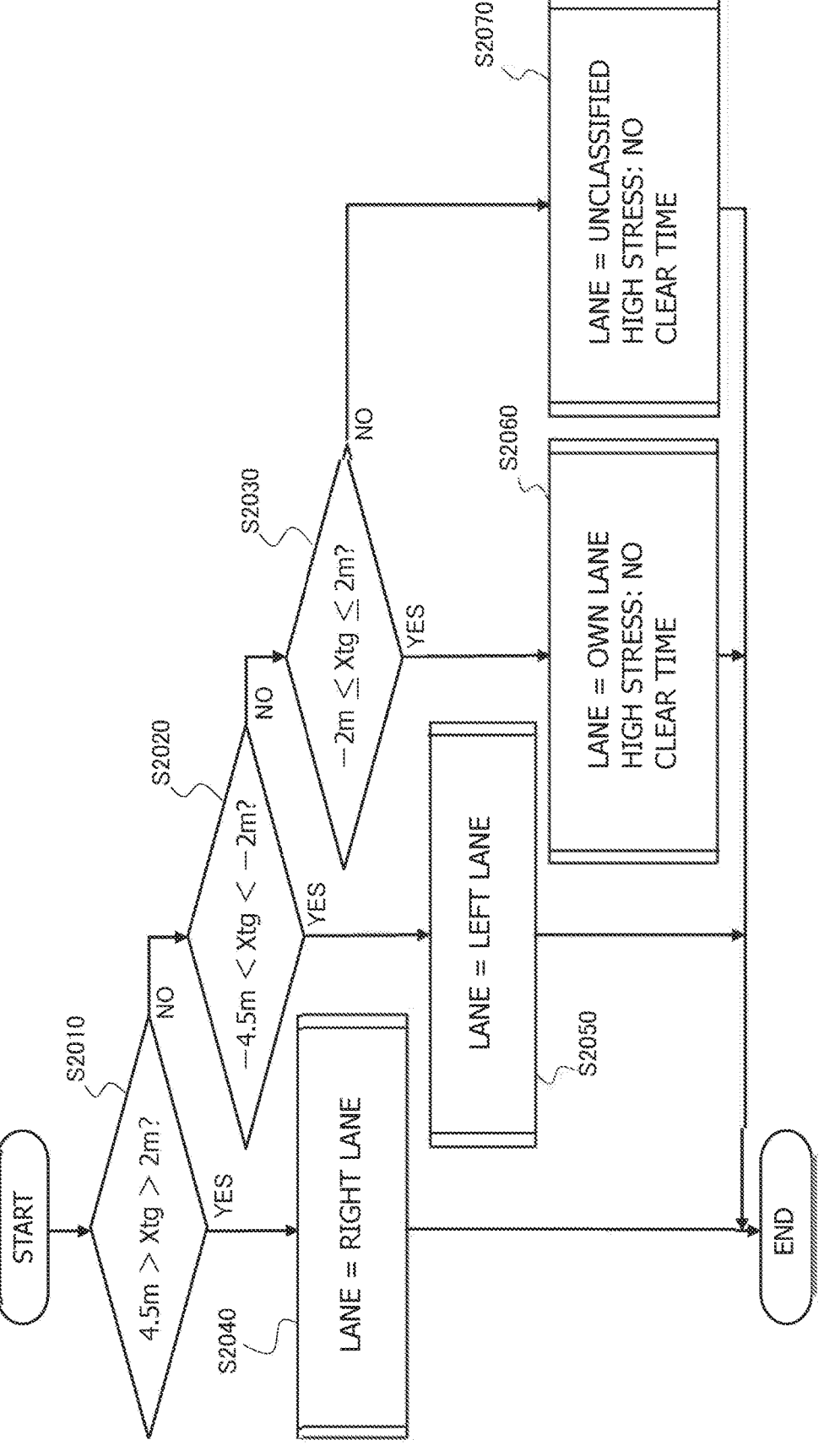
FIG. 4 is a flowchart illustrating a process of classifying lanes of nearby vehicles.

FIG. 4 is a flowchart illustrating the details of the lane classification process at step S2000 in FIG. 2.

Here, at step S2000, vehicle control device 510 performs the same process on all sets of nearby vehicle data that are in the tracking database and are related to nearby vehicles traveling in the same direction as vehicle 100.

At step S2010, vehicle control device 510 determines whether a relative lateral position Xtg [m], relative to vehicle 100, of the subject vehicle of the lane classification process is within a range greater than 2 m and less than 4.5 m (2 m<Xtg<4.5 m).

Here, the relative lateral position Xtg indicates a position to the right of the center of gravity of vehicle 100 with a positive value and indicates a position to the left of the center of gravity of vehicle 100 with a negative value. Also, it is assumed that the width of each lane is about 3.5 m.

When the relative lateral position Xtg of the subject vehicle relative to vehicle 100 is within the range greater than 2 m and less than 4.5 m, vehicle control device 510 proceeds to step S2040 and sets the driving lane information of the subject vehicle to the adjacent right lane that is to the right of the own lane.

In contrast, when the relative lateral position Xtg of the subject vehicle relative to vehicle 100 is not within the range greater than 2 m and less than 4.5 m, vehicle control device 510 proceeds to step S2020 and determines whether the relative lateral position Xtg of the subject vehicle relative to vehicle 100 is within a range greater than −4.5 m and less than −2 m (−2 m>Xtg>−4.5 m).

Then, when the relative lateral position Xtg of the subject vehicle relative to vehicle 100 is within the range greater than −4.5 m and less than −2 m, vehicle control device 510 proceeds to step S2050 and sets the driving lane information of the subject vehicle to the adjacent left lane that is to the left of the own lane.

In contrast, when the relative lateral position Xtg of the subject vehicle relative to vehicle 100 is not within the range greater than −4.5 m and less than −2 m, vehicle control device 510 proceeds to step S2030 and determines whether the relative lateral position Xtg of the subject vehicle relative to vehicle 100 is greater than or equal to −2 m and less than or equal to 2 m (−2 m≤Xtg≤2 m).

When the relative lateral position Xtg of the subject vehicle relative to vehicle 100 is greater than or equal to −2 m and less than or equal to 2 m, vehicle control device 510 proceeds to step S2060 and sets the driving lane information of the subject vehicle to the own lane (first lane).

Also, at step S2060, vehicle control device 510 cancels the determination result indicating that the subject vehicle is a high-stress vehicle, and clears the detection time Ths of the high-stress vehicle.

When determining, at step S2030, that the relative lateral position Xtg of the subject vehicle relative to vehicle 100 is not greater than or equal to −2 m and less than or equal to 2 m, vehicle control device 510 determines that the driving lane of the subject vehicle corresponds to none of the adjacent right lane, the adjacent left lane, and the own lane and proceeds to step S2070.

At step S2070, vehicle control device 510 sets the driving lane information of the subject vehicle to "unclassified", cancels the determination result indicating that the subject vehicle is a high-stress vehicle, and clears the detection time Ths of the high-stress vehicle.

For example, when the own lane is the leftmost lane in a road with three lanes in each direction and the subject vehicle is traveling in the rightmost lane, vehicle control device 510 proceeds to step S2070 and sets the driving lane information of the subject vehicle to "unclassified".

Here, appropriate decision thresholds of the relative lateral position Xtg used for the lane classification process vary depending on, for example, the lane width and are not limited to 2 m and 4.5 m used in the above descriptions.

Figure 5:
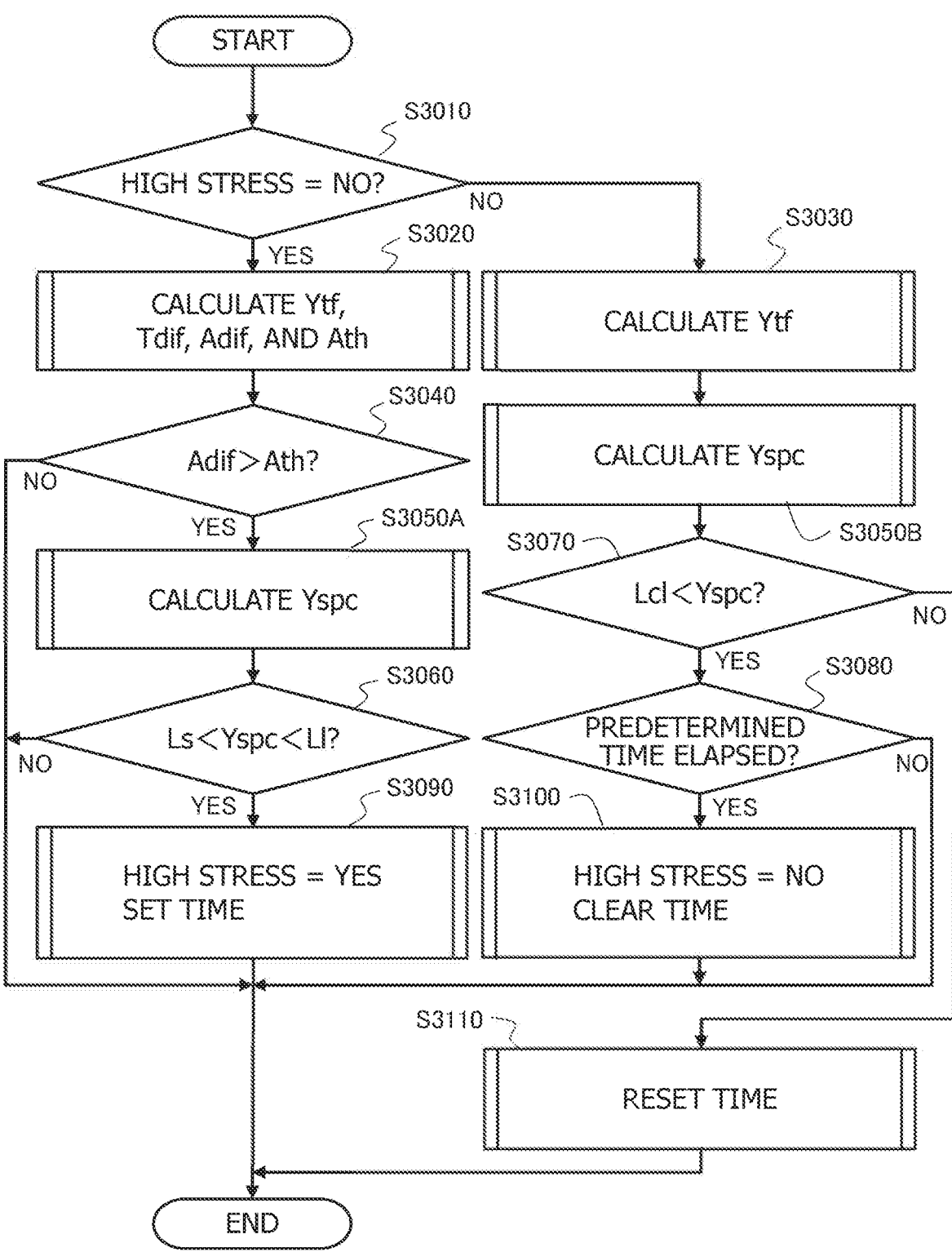
FIG. 5 is a flowchart illustrating a process of extracting a high-stress vehicle.

FIG. 5 is a flowchart illustrating the details of the process of extracting a high-stress vehicle at step S3000 in FIG. 2.

Here, at step S2000, vehicle control device 510 performs the same process on sets of nearby vehicle data that are in the tracking database and are related to nearby vehicles traveling in the left adjacent lane and nearby vehicles traveling in the right adjacent lane.

Figure 6:
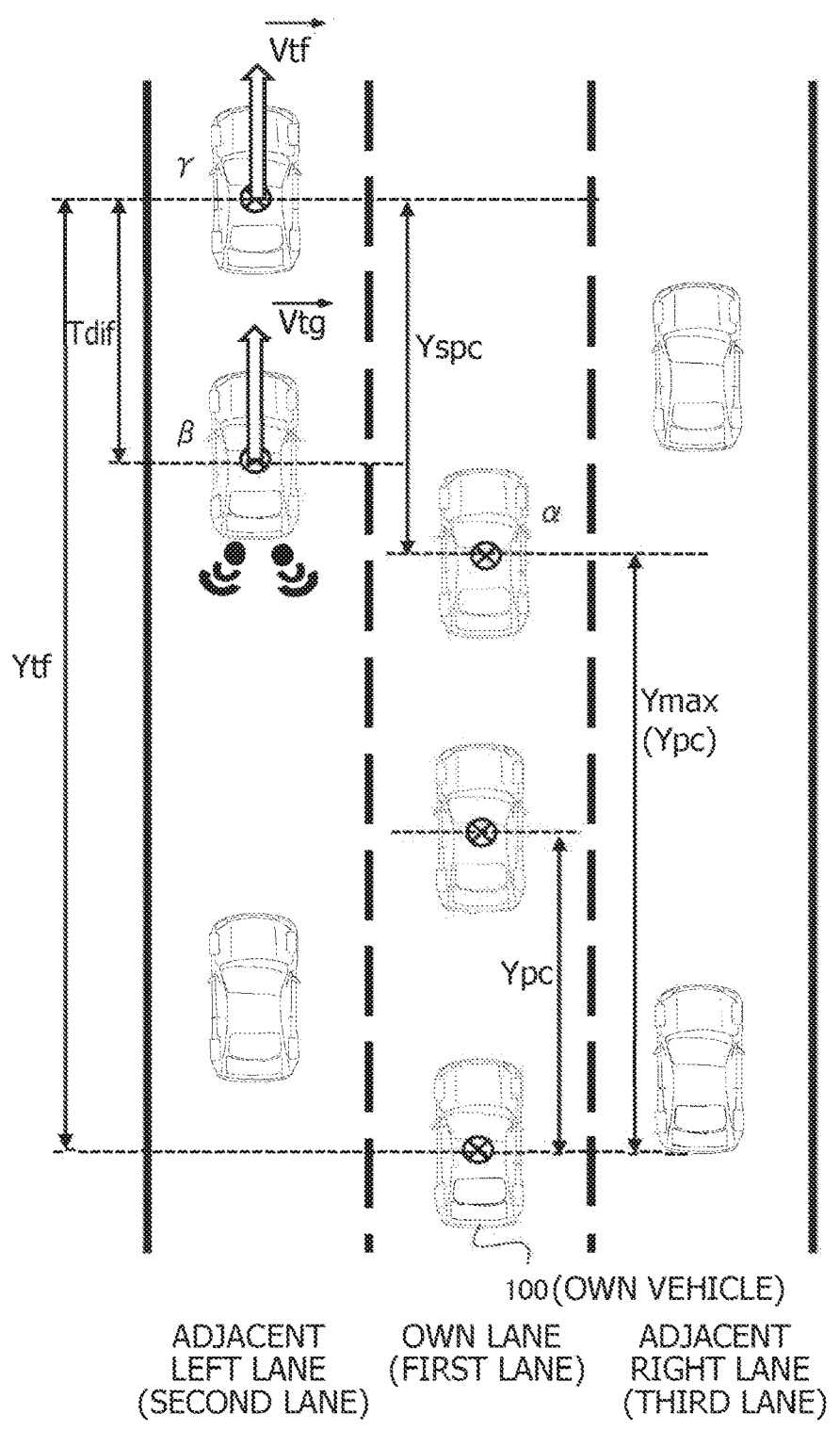
FIG. 6 is a drawing illustrating an example of vehicle driving conditions around an own vehicle.

Also, FIG. 6 illustrates vehicle driving conditions around vehicle 100 when a high-stress vehicle is set at step S3000.

At step S3010, vehicle control device 510 determines whether a determination result indicating a high-stress vehicle is set for a subject vehicle β traveling in the same direction as vehicle 100 in a lane adjacent to the own lane.

When the subject vehicle β is not set as a high-stress vehicle, vehicle control device 510 proceeds to step S3020.

At step S3020, vehicle control device 510 calculates an inter-vehicle time Tdif [sec] between a subject vehicle β and a leading vehicle γ traveling immediately in front of the subject vehicle β, a longitudinal relative position Ytf [m] of the leading vehicle γ relative to the own vehicle (vehicle 100), a threshold Ath [m/s²] for determining a rapid deceleration, and a relative acceleration Adif [m/s²] (relative deceleration) of the subject vehicle β relative to the leading vehicle γ (see FIG. 6).

Here, the relative acceleration Adif is calculated as a positive value when the subject vehicle β is decelerating relative to the leading vehicle γ, and the threshold Ath satisfies Ath> 0.

Figure 7:
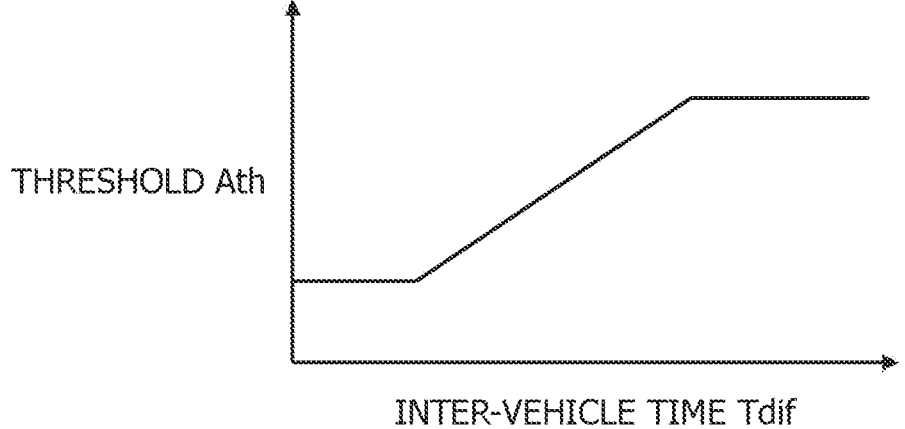
FIG. 7 is a graph representing a correlation between an inter-vehicle time Tdif and a threshold Ath for determining a rapid deceleration.

FIG. 7 is a graph indicating a correlation between the inter-vehicle time Tdif and the threshold Ath.

Vehicle control device 510 sets the threshold Ath based on the inter-vehicle time Tdif according to the characteristics indicated by FIG. 7, and increases the threshold Ath (decision threshold) as the inter-vehicle time Tdif increases.

This makes it possible to set a subject vehicle β making a movement to come extremely close to the leading vehicle γ as a high-stress vehicle even if the deceleration of the subject vehicle β relative to the leading vehicle γ is not very great.

Also, because it is assumed that the leading vehicle γ and the vehicle β are traveling in the same direction in the calculation process of the relative acceleration Adif, vehicle control device 510 can obtain a scalar value indicating a difference between the longitudinal direction components of acceleration vectors.

Next, vehicle control device 510 proceeds to step S3040 and determines whether the relative acceleration Adif is greater than the threshold Ath (Adif>Ath), that is, whether the subject vehicle β has decelerated relative to the leading vehicle γ at a deceleration exceeding the threshold Ath.

In other words, vehicle control device 510 determines whether the subject vehicle has traveled at a speed faster than the leading vehicle γ by a predetermined value to approach the leading vehicle γ and has decelerated without making a lane change.

Here, when Adif>Ath is not satisfied, that is, when the subject vehicle β has not decelerated relative to the leading vehicle γ at a deceleration exceeding the threshold Ath, vehicle control device 510 terminates the process without performing any other step and then performs the process of step S3000 for the next nearby vehicle data.

On the other hand, when Adif>Ath is satisfied, that is, when the vehicle β has decelerated relative to the leading vehicle γ at a deceleration exceeding the threshold Ath, vehicle control device 510 proceeds to step S3050A and calculates a lane change space Yspc to be used by the subject vehicle β, which travels in the adjacent lane, has approached the leading vehicle γ, and has rapidly decelerated, to make a lane change to the own lane.

Figure 8:
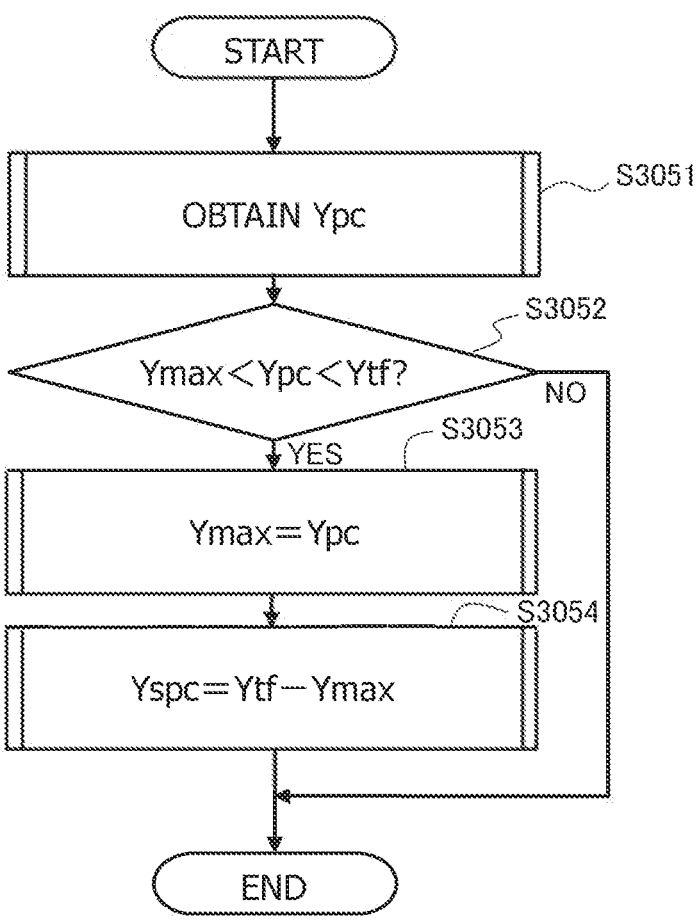
FIG. 8 is a flowchart illustrating a process of calculating a lane change space.

FIG. 8 is a flowchart illustrating a process performed by vehicle control device 510 at step S3050A to calculate the lane change space Yspc [m].

At step S3051, vehicle control device 510 obtains a longitudinal relative position Ypc [m], which is relative to vehicle 100, of a vehicle traveling in front of vehicle 100 in the own lane.

Next, vehicle control device 510 proceeds to step S3052 and determines whether the longitudinal relative position Ypc [m] obtained at step S3051 is less than the longitudinal relative position Ytf [m], which is relative to vehicle 100, of the leading vehicle γ in front of the subject vehicle β traveling in the adjacent lane and is greater than a maximum value Ymax of the longitudinal relative position Ypc (Ymax<Ypc<Ytf).

Here, the initial value of the maximum value Ymax is 0 [m].

When Ymax<Ypc<Ytf is satisfied, vehicle control device 510 proceeds to step S3053 and sets the maximum value Ymax to the value of the longitudinal relative position Ypc obtained at step S3051.

Next, vehicle control device 510 proceeds to step S3054 and calculates the lane change space Yspc [m] based on the longitudinal relative position Ytf and the maximum value Ymax using a formula Yspc=Ytf−Ymax.

Then, vehicle control device 510 repeats the process of steps S3051 through S3054 while changing target leading vehicles in the own lane from, for example, a vehicle A traveling immediately in front of vehicle 100 to a vehicle β traveling immediately in front of the vehicle A.

As a result, the lane change space Yspc is represented by a relative distance between the leading vehicle γ traveling immediately in front of the subject vehicle β traveling in the adjacent lane and a vehicle α (third vehicle) that is one of the leading vehicles traveling in the own lane and is traveling behind the leading vehicle γ at a position closest to the leading vehicle γ (see FIG. 6).

That is, at step S3052, vehicle control device 510 determines whether a target leading vehicle in front of vehicle 100 is traveling behind the leading vehicle γ traveling immediately in front of the subject vehicle β traveling in the adjacent lane by comparing the longitudinal relative position Ypc with the longitudinal relative position Ytf.

Furthermore, vehicle control device 510 compares the longitudinal relative position Ypc with the maximum value Ymax to determine, among leading vehicles traveling in the own lane behind the leading vehicle γ traveling immediately in front of the subject vehicle traveling in the adjacent lane, the vehicle α that is traveling closest to the leading vehicle γ (see FIG. 6).

Then, vehicle control device 510 obtains the distance between the leading vehicle γ traveling in the adjacent lane in front of the subject vehicle β and the vehicle α traveling in the own lane immediately behind the leading vehicle γ as the lane change space Yspc to be used by the subject vehicle β, which is traveling in the adjacent lane and has made a rapid deceleration, to make a lane change to the own lane.

If the lane change space Yspc is insufficient, it can be presumed that although the subject vehicle β attempted to make a lane change to the own lane, the subject vehicle β was unable to cut in front of the vehicle α, and decelerated rapidly.

After obtaining the lane change space Yspc at step S3050A in the flowchart in FIG. 5, vehicle control device 510 proceeds to step S3060.

At step S3060, vehicle control device 510 determines whether the lane change space Yspc is within a range between a threshold Ls and a threshold L1 (0<Ls<L1), that is, whether Ls<Yspc<L1 is satisfied.

Here, the threshold Ls is set to a sufficiently small value that a lane change is not normally expected so that it can be presumed that a lane change is not possible when the lane change space Yspc is less than or equal to the threshold Ls.

Also, the threshold L1 is set at a sufficiently large value that a lane change is normally possible so that it can be presumed that sufficient space to make a lane change is available when the lane change space Yspc is greater than or equal to the threshold L1.

Therefore, when Ls<Yspc<L1 is satisfied, it indicates that the lane change space Yspc is large enough to try a lane change but is still insufficient.

When it is determined at step S3060 that Ls<Yspc<L1 is not satisfied, that is, when the lane change space Yspc is less than or equal to the threshold Ls or the lane change space Yspc is greater than or equal to the threshold L1, vehicle control device 510 ends the process and retains the determination result indicating that the subject vehicle β is not a high-stress vehicle.

That is, when the lane change space Yspc is sufficiently small to prevent trying to make a lane change or the lane change space Yspc is sufficiently large to make a lane change, it can be presumed that the subject vehicle β is not in a high-stress state, and therefore vehicle control device 510 retains the determination result indicating that the subject vehicle β is not a high-stress vehicle.

On the other hand, when it is determined at step S3060 that Ls<Yspc<L1 is satisfied, vehicle control device 510 proceeds to step S3090, ends the process after setting a high stress decision in the tracking data of the subject vehicle β and setting the current time as the detection time Ths of the high-stress vehicle, and repeats the process of step S3000 for the next nearby vehicle data.

In this case, because the lane change space Yspc has a size that is large enough to try a lane change but is still insufficient, it can be presumed that the subject vehicle β is in a high-stress state in which the subject vehicle β tries to, but is unable to, make a lane change. Therefore, vehicle control device 510 sets the subject vehicle β as a high-stress vehicle.

As described above, vehicle control device 510 sets the subject vehicle β as a high-stress vehicle when the relative acceleration Adif between the subject vehicle β and the leading vehicle γ in front of the subject vehicle β is greater than the threshold Ath based on the inter-vehicle time between the subject vehicle β and the leading vehicle γ and when the lane change space Yspc in the own lane is within a range between predetermined thresholds (Ls<Yspc<L1).

When it is determined that the subject vehicle β is a high-stress vehicle, vehicle control device 510 proceeds from step S3010 to step S3030.

At step S3030, vehicle control device 510 calculates the longitudinal relative position Ytf [m], which is relative to the own vehicle (vehicle 100), of the leading vehicle γ traveling immediately in front of the subject vehicle β.

Next, vehicle control device 510 proceeds to step S3050B and calculates the lane change space Yspc for the subject vehicle β set as a high-stress vehicle to monitor changes in the lane change space Yspc after the subject vehicle β is determined as a high-stress vehicle.

Here, because vehicle control device 510 calculates the lane change space Yspc at step S3050B in a manner similar to step S3050A according to the process illustrated in the flowchart in FIG. 8, explanation of details of the process is omitted.

Next, vehicle control device 510 proceeds to step S3070 and compares the lane change space Yspc calculated at step S3050 with a threshold Lcl to determine whether the lane change space Yspc is greater than the threshold Lcl.

The threshold Lcl is adjusted so that it is possible to determine that a sufficient space to make a lane change is available when the lane change space Yspc is greater than the threshold Lcl. Here, the threshold Lcl is set at a value greater than or equal to the threshold L1 (0<Ls<L1≤Lcl).

When the lane change space Yspc is less than or equal to the threshold Lcl and there is not a sufficient space to make a lane change, vehicle control device 510 proceeds to step S3110 to set the detection time Ths of the high-stress vehicle to the current time, and repeats the process of step S3000 for the next nearby vehicle data.

That is, when the lane change space Yspc is less than or equal to the threshold Lcl, vehicle control device 510 determines that the subject vehicle β remains in a high-stress state in which the subject vehicle β attempts to, but is unable to, make a lane change because the lane change space Yspc is insufficient.

On the other hand, when the lane change space Yspc is greater than the threshold Lcl and there is sufficient space to make a lane change, vehicle control device 510 proceeds to step S3080 and determines whether an elapsed time from the detection time Ths is greater than or equal to a predetermined time.

Because the detection time Ths is the time at which Yspc≤Lcl was satisfied the last time at step S3070, the elapsed time from the detection time Ths indicates a duration after Yspc>Lcl is satisfied.

Also, the predetermined time in step S3080 is set to be longer than the normal time taken by the subject vehicle β going to make a lane change to actually make the lane change after sufficient space for the lane change becomes available.

Accordingly, when the elapsed time from the detection time Ths is greater than or equal to the predetermined time, it indicates that the subject vehicle β has not made a lane change even though sufficient space for the lane change has become available and it is presumed that the subject vehicle β has no intention of making a lane change.

When determining at step S3080 that the elapsed time from the detection time Ths is greater than or equal to the predetermined time, vehicle control device 510 proceeds to step S3100.

At step S3100, vehicle control device 510 cancels the determination result indicating that the subject vehicle β is a high-stress vehicle to cancel the setting of the subject vehicle β as the high-stress vehicle, ends the process after clearing the detection time Ths, and repeats the process of step S3000 for the next nearby vehicle data.

That is, when the lane change space Yspc for the subject vehicle β set as a high-stress vehicle is greater than a predetermined space indicated by the threshold Lcl and a predetermined time elapses after setting the subject vehicle β as the high-stress vehicle, vehicle control device 510 cancels the setting of the subject vehicle β as the high-stress vehicle.

On the other hand, when the elapsed time from the detection time Ths is less than the predetermined time, there is a possibility that the subject vehicle β makes a lane change before the elapsed time reaches the predetermined time.

Therefore, when the elapsed time from the detection time Ths is less than the predetermined time, vehicle control device 510 bypasses step S3100 to end the process while maintaining the setting indicating that the subject vehicle β is a high-stress vehicle, and repeats the process of step S3000 for the next nearby vehicle data.

Figure 9:
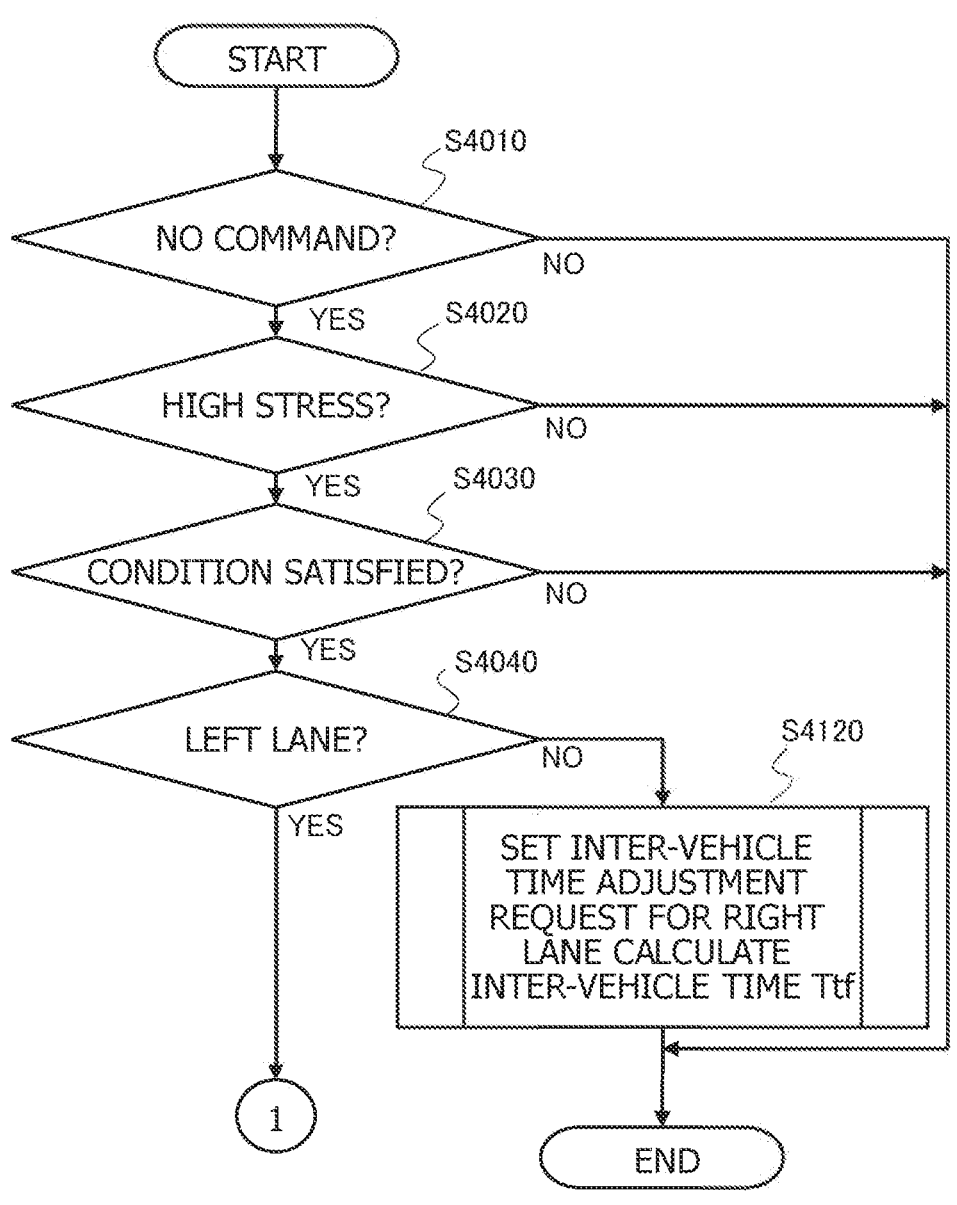
FIG. 9 is a flowchart illustrating a process of recognizing a driving environment.
Figure 10:
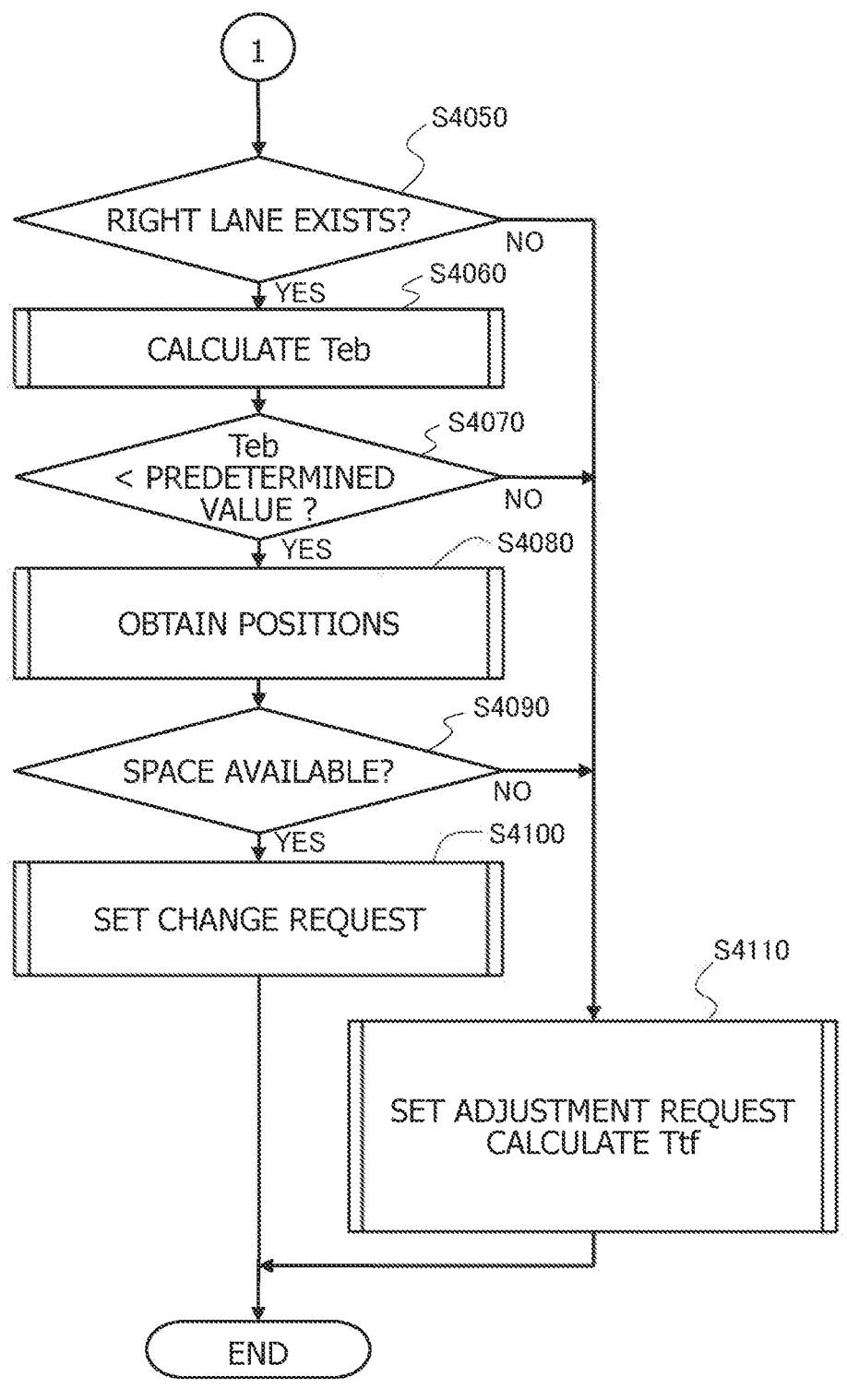
FIG. 10 is a flowchart illustrating a process of recognizing a driving environment.

FIGS. 9 and 10 are flowcharts illustrating the details of the driving environment recognition process at step S4000 in FIG. 2.

Here, at step S4000, vehicle control device 510 performs the same process on sets of nearby vehicle data that are in the tracking database and related to nearby vehicles traveling in the adjacent left lane and nearby vehicles traveling in the adjacent right lane.

Figure 11:
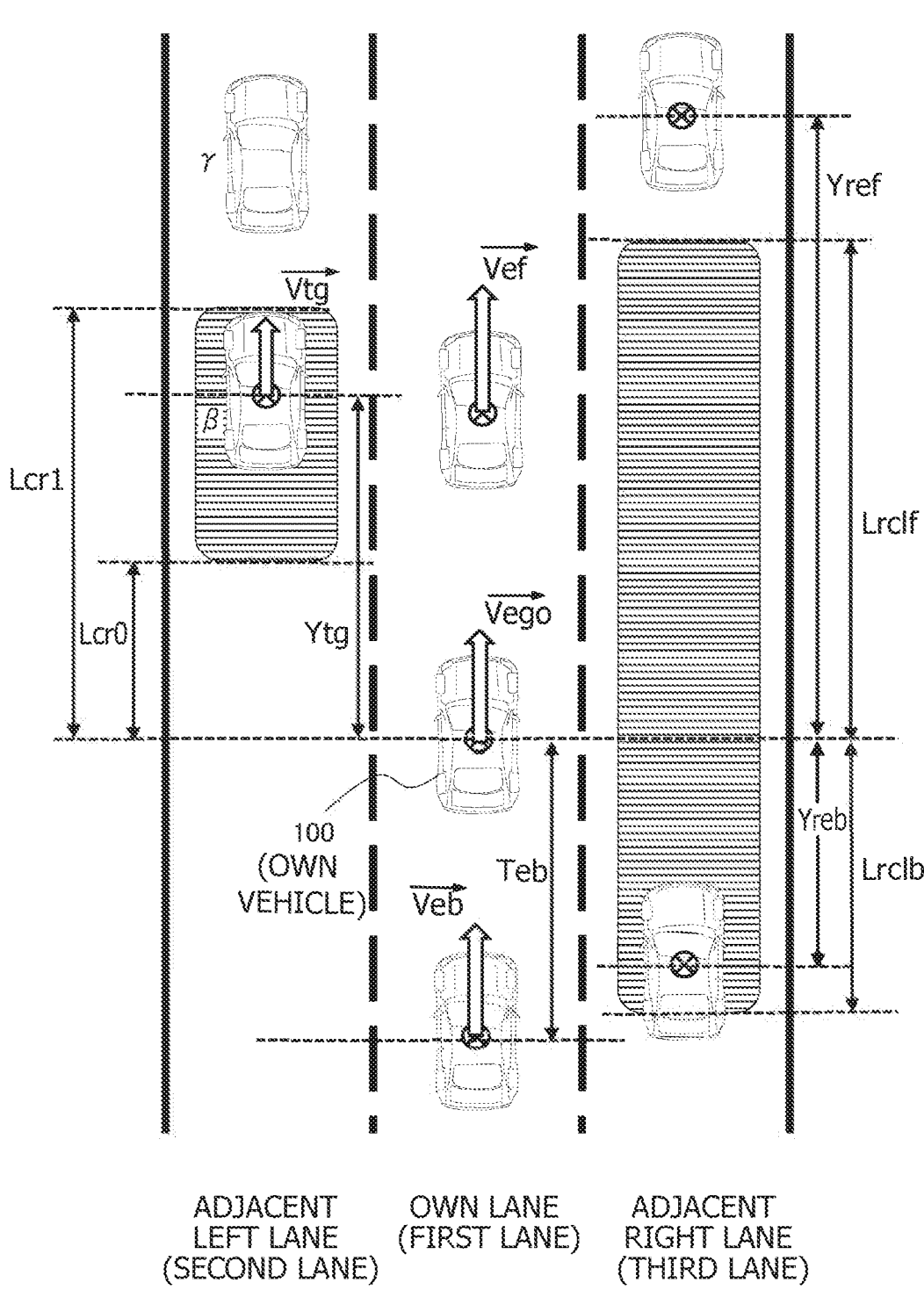
FIG. 11 is a drawing illustrating a lane change space.

Also, FIG. 11 illustrates an example of driving conditions when a request to change the driving state of vehicle 100 is set at step S4000.

At step S4010, vehicle control device 510 determines whether an inter-vehicle time adjustment command or a lane change command has been set.

When a speed adjustment request or a lane change request has already been set, because a braking-driving force control or a steering angle control will be performed based on the set request, vehicle control device 510 ends the process without newly setting a request at step S4000.

On the other hand, when neither the speed adjustment request nor the lane change request has been set, vehicle control device 510 proceeds to step S4020 and determines whether the subject vehicle β is designated as a high-stress vehicle. When the subject vehicle β is not designated as a high-stress vehicle, vehicle control device 510 ends the process.

When the subject vehicle β is designated as a high-stress vehicle, vehicle control device 510 proceeds to step S4030.

At step S4030, vehicle control device 510 determines whether a first condition (Lcr0< Ytg<Lcr1) related to a position is satisfied. The first condition indicates that the longitudinal relative position Ytg [m] of the subject vehicle β relative to vehicle 100 is within an attention area defined as being between a position at a distance Lcr0 [m] in front of vehicle 100 and a position at a distance Lcr1 [m] ($0<Lcr0<Lcr1$).

Furthermore, at step S4030, vehicle control device 510 determines whether a second condition (velocity vector Vef–velocity vector Vtg>predetermined value) related to a speed is satisfied. The second condition indicates that the velocity vector Vef of a vehicle traveling immediately in front of vehicle 100 in the same lane as vehicle 100 is greater than the velocity vector Vtg of the subject vehicle β by the predetermined value.

Here, the distance Lcr0 is set at a distance from vehicle 100 that enables the subject vehicle β to make a lane change to a position in front of vehicle 100, and the distance Lcr1 is set at a distance with which vehicle 100 should make way for the subject vehicle β.

That is, when the longitudinal relative position Ytg of the subject vehicle β is less than or equal to the distance Lcr0, it is difficult for the subject vehicle β to make a lane change to the own lane; and when the longitudinal relative position Ytg of the subject vehicle β is greater than or equal to the distance Lcr1, the necessity for vehicle 100 to make way for the subject vehicle β is sufficiently low.

Also, the second condition (velocity vector Vef–velocity vector Vtg>predetermined value) indicates that the leading vehicle in front of vehicle 100 is traveling at a speed higher than the subject vehicle β, and the subject vehicle β can travel at a faster speed by cutting into the lane behind the leading vehicle in front of vehicle 100, i.e., between vehicle 100 and the leading vehicle and by following the leading vehicle.

In other words, when the second condition is satisfied, it is presumable that the high-stress state of the subject vehicle β can be reduced or resolved once vehicle 100 makes way for the subject vehicle β and the subject vehicle β makes a lane change to the own lane.

When determining, at step S4030, that at least one of the first condition (Lcr0<Ytg<Lcr1) and the second condition (velocity vector Vef–velocity vector Vtg>predetermined value) is not satisfied, vehicle control device 510 ends the process without setting the speed adjustment request and the lane change request and without performing a control for dealing with the high-stress vehicle.

On the other hand, when determining, at step S4030, that both of the first condition (Lcr0<Ytg<Lcr1), which is related to the relative position between vehicle 100 and the subject vehicle β that is a high-stress vehicle, and the second condition (velocity vector Vef–velocity vector Vtg>predetermined value), which is related to the relative velocity between the leading vehicle in front of vehicle 100 and the subject vehicle β that is a high-stress vehicle, are satisfied, vehicle control device 510 proceeds to step S4040 to set a control command for changing the driving state of vehicle 100.

At step S4040, vehicle control device 510 determines whether the driving lane of the subject vehicle β is the lane (adjacent left lane) to the left of the own lane.

Here, when the driving lane of the subject vehicle β is the adjacent left lane of the own lane, vehicle control device 510 proceeds to step S4050 to consider whether to cause vehicle 100 to make a lane change from the current driving lane to the adjacent right lane (passing lane).

On the other hand, when the driving lane of the subject vehicle β is not the adjacent left lane, that is, when the driving lane of the subject vehicle β is a lane (adjacent right lane) to the right of the own lane, vehicle control device 510 proceeds to step S4120.

At step S4120, vehicle control device 510 sets the inter-vehicle time adjustment request (speed adjustment request) for the adjacent right lane, and calculates the inter-vehicle time Ttf [sec] between the own vehicle (vehicle 100) and the leading vehicle γ in front of the subject vehicle β.

Also, vehicle control device 510 attaches a tracking data ID of the subject vehicle and a tracking data ID of the leading vehicle γ to the data of the calculated inter-vehicle time Ttf [sec].

The inter-vehicle time adjustment request (speed adjustment request) is a command to change the inter-vehicle time in the vehicle-following driving control of vehicle 100 (in other words, a control command for adjusting the speed of vehicle 100) to enable the subject vehicle β (high-stress vehicle) traveling in the next lane to make a lane change to the own lane.

When the driving lane (second lane) of the subject vehicle β is to the right of the own lane (first lane), vehicle control device 510 adjusts the speed of vehicle 100 to make way for the subject vehicle β set as a high-stress vehicle.

On the other hand, when the driving lane of the subject vehicle β is an adjacent lane to the left of the own lane, vehicle control device 510 proceeds from step S4040 to step S4050 and determines whether a driving lane exists to the right of the own lane.

When no driving lane exists to the right of the own lane, it is not possible to cause vehicle 100 to make a lane change to a lane to the right of the current driving lane to make way for the subject vehicle β.

Therefore, when no driving lane exists to the right of the own lane, that is, when the driving lane (second lane) of the subject vehicle β is to the left of the own lane (first lane) and the own lane is the rightmost lane, vehicle control device 510 proceeds to step S4110 to set the inter-vehicle time adjustment request for the adjacent left lane and calculate the inter-vehicle time Ttf [sec] between the own vehicle (vehicle 100) and the leading vehicle γ in front of the subject vehicle β.

Here, similarly to step S4120, vehicle control device 510 attaches a tracking data ID of the subject vehicle β and a tracking data ID of the leading vehicle γ to the data of the calculated inter-vehicle time Ttf [sec].

Also, when determining, at step S4050, that a driving lane exists to the right of the own lane, vehicle control device 510 proceeds to step S4060 and calculates an inter-vehicle time Teb [sec] between vehicle 100 and a trailing vehicle traveling in the own lane immediately behind vehicle 100.

Next, vehicle control device 510 proceeds to step S4070 and determines whether the inter-vehicle time Teb calculated at step S4060 is less than a predetermined inter-vehicle time.

The predetermined inter-vehicle time compared with the inter-vehicle time Teb at step S4070 is a threshold that is used to determine whether the deceleration of vehicle 100 to make way for the subject vehicle β influences the driving of a trailing vehicle behind vehicle 100. The predetermined inter-vehicle time is adjusted so that when the inter-vehicle time Teb is greater than or equal to the predetermined inter-vehicle time, it is presumable that the influence of the deceleration of vehicle 100 to make way for the subject vehicle β on the driving of the trailing vehicle is sufficiently small.

Therefore, when the inter-vehicle time Teb is greater than or equal to the predetermined inter-vehicle time, vehicle control device 510 proceeds to step S4110 described above to set the inter-vehicle time adjustment request for the adjacent left lane and calculate the inter-vehicle time Ttf [sec] between the own vehicle (vehicle 100) and the leading vehicle γ in front of the subject vehicle β.

As a result of the determination process at step S4070 described above, in a situation in which the deceleration of vehicle 100 to make way for the subject vehicle β is allowed, the inter-vehicle time adjustment request is given priority over the lane change request.

In contrast, when the inter-vehicle time Teb is less than the predetermined inter-vehicle time, the deceleration of vehicle 100 to make way for the subject vehicle β may affect the driving of the trailing vehicle.

Therefore, vehicle control device 510 proceeds to step S4080 to determine whether a lane change of vehicle 100 is possible.

At step S4080, vehicle control device 510 obtains longitudinal relative positions Yref and Yreb [m], which are relative to vehicle 100, of vehicles traveling in a lane to the right of the own lane.

As illustrated in FIG. 11, the longitudinal relative position Yref indicates a relative position, in the longitudinal direction relative to vehicle 100, of a vehicle traveling in front of vehicle 100 in a lane to the right of the own lane, and the longitudinal relative position Yreb indicates a relative position, in the longitudinal direction relative to vehicle 100, of a vehicle traveling behind vehicle 100 in the lane to the right of the own lane.

Here, each of the longitudinal relative positions Yref and Yreb indicates a position in front of vehicle 100 with a positive value and indicates a position behind vehicle 100 with a negative value.

Next, vehicle control device 510 proceeds to step S4090 and determines whether both of a first condition (Yref>Lrclf) and a second condition (Yreb<Lrclb) are satisfied. The first condition indicates that the longitudinal relative position Yref is greater than a threshold Lrclf (Lrclf>0), and the second condition indicates that the longitudinal relative position Yreb is less than a threshold Lrclb (Lrclb<0, 0<|Lrclb|<|Lrclf|).

In other words, the first condition indicates that the relative distance between vehicle 100 and a vehicle traveling in front of vehicle 100 in a lane to the right of the own lane is longer than a first threshold, and the second condition indicates that the relative distance between vehicle 100 and a vehicle traveling behind vehicle 100 in the lane to the right of the own lane is longer than a second threshold (first threshold>second threshold).

That is, vehicle control device 510 determines whether a vehicle traveling in front of vehicle 100 in a lane to the right of the own lane is away from vehicle 100 by a predetermined first distance or more and a vehicle traveling behind vehicle 100 in the lane to the right of the own lane is away from vehicle 100 by a predetermined second distance or more and thereby determines whether there is a sufficient space for vehicle 100 to make a lane change to the lane to the right of the own lane.

Here, vehicle control device 510 classifies a vehicle traveling just beside vehicle 100 in a lane to the right of the own lane as a vehicle traveling in front of vehicle 100 and/or a vehicle traveling behind vehicle 100.

When determining at step S4090 that at least one of the first condition and the second condition is not satisfied, that is, when there is not a sufficient space for vehicle 100 to make a lane change to the adjacent right lane and it is difficult to make a lane change, vehicle control device 510 proceeds to step S4110 to set the inter-vehicle time adjustment request for the adjacent left lane and calculate the inter-vehicle time Ttf [sec] between the own vehicle (vehicle 100) and the leading vehicle γ in front of the subject vehicle β.

On the other hand, when determining, at step S4090, that both of the first condition and the second condition are satisfied, that is, when there is no vehicle in an attention area in the lane to the right of the own lane between a position that is away from vehicle 100 in the forward direction by the threshold Lrclf and a position that is away from vehicle 100 in the backward direction by the threshold Lrclb and vehicle 100 can make a lane change because there is a sufficient space for vehicle 100 to make a lane change to the right adjacent lane, vehicle control device 510 proceeds to step S4100.

At step S4100, vehicle control device 510 sets a lane change request for causing vehicle 100 to make a lane change to an adjacent right lane to make way for the subject vehicle β.

As described above, vehicle control device 510 outputs a control command to cause vehicle 100 to make a lane change to an adjacent right lane to the right of the own lane when the following three conditions are satisfied.

First condition: the driving lane (second lane) of the subject vehicle β, which is a high-stress vehicle, is located to the left of the own lane (first lane), and a lane (third lane) exists to the right of the own lane.

Second condition: the inter-vehicle time Teb between vehicle 100 and a vehicle (fourth vehicle) traveling behind vehicle 100 in the own lane (first lane) is shorter than a predetermined inter-vehicle time.

Third condition: the relative distance between vehicle 100 and a vehicle (fifth vehicle) traveling in front of vehicle 100 in an adjacent right lane (third lane) to the right of the own lane is longer than a predetermined first distance, and the relative distance between vehicle 100 and a vehicle (sixth vehicle) traveling behind vehicle 100 in an adjacent right lane (third lane) to the right of the own lane is longer than a predetermined second distance.

As described above, the lane change request is set when a condition in which there is sufficient space in the adjacent right lane for vehicle 100 to make a lane change, in other words, a condition in which no vehicle exists in an attention area defined by the thresholds Lrclf and Lrclb (see FIG. 11) is satisfied. Therefore, when the lane change request is set based on one of possibly-present multiple high-stress vehicles, it indicates that no high-stress vehicle is present in the attention area in the adjacent right lane.

Also, even in a case in which multiple high-stress vehicles exist in an attention area in the adjacent left lane, i.e., in an area in the adjacent left lane between the position at the distance Lcr0 and the position at the distance Lcr1 (see FIG. 11) in front of vehicle 100, the process from step S4050 to step S4090 performed using each high-stress vehicle as the subject vehicle β is the same.

Therefore, when it is determined that a lane change is possible in a process performed using one of multiple high-stress vehicles existing in an attention area in the adjacent left lane as the subject vehicle β, it will also be determined that a lane change is possible in processes performed for other high-stress vehicles.

Accordingly, after proceeding to step S4100 and setting the lane change request, vehicle control device 510 can cancel the process of step S4000 for other subject vehicles β and move on to the process of step S5000.

The inter-vehicle time adjustment request for the adjacent right lane, the inter-vehicle time adjustment request for the adjacent left lane, and the lane change request set in the process of step S4000 are cleared when the process initially proceeds from step S3000 to step S4000. When these requests have already been set in the process of step S4000 performed for each set of nearby vehicle data, the requests are overwritten.

Figure 12:
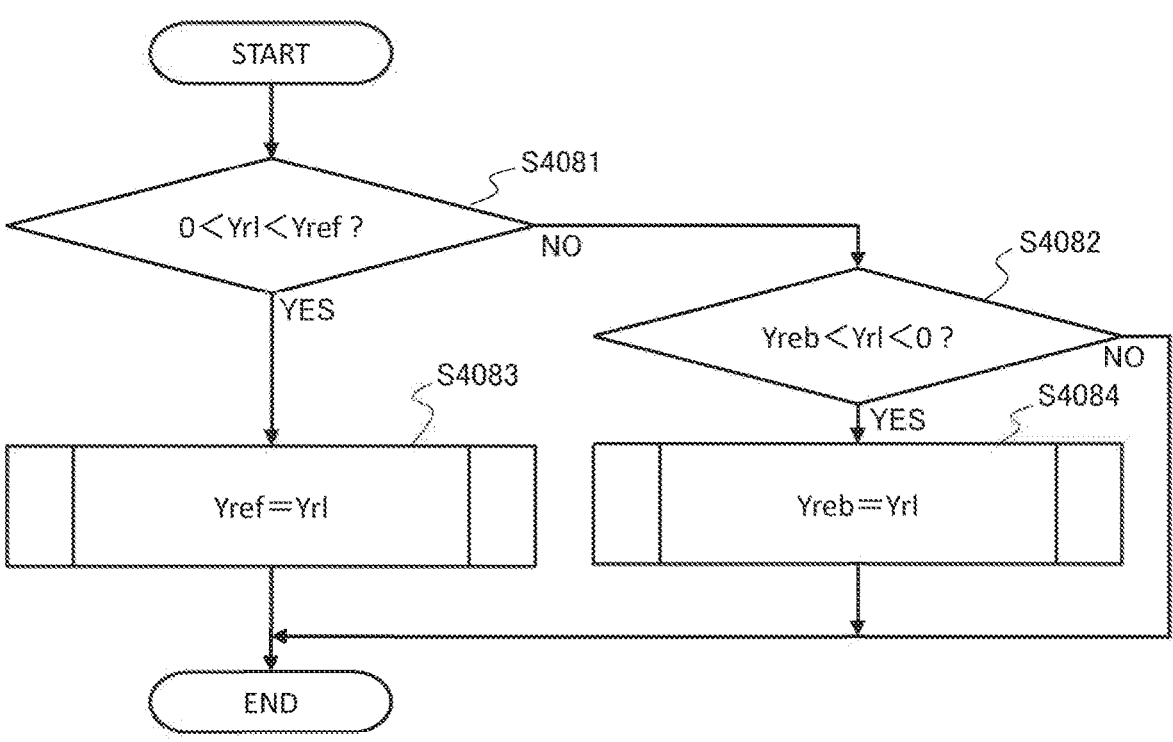
FIG. 12 is a flowchart illustrating a process of obtaining the position of a vehicle in the right lane.

FIG. 12 is a flowchart illustrating a process performed at step S4080 in the flowchart in FIG. 10 to obtain the position of a vehicle traveling in an adjacent right lane.

At step S4080, the same process is performed on all sets of nearby vehicle data in the tracking database that are related to nearby vehicles traveling in an adjacent right lane to the right of the own lane.

At step S4081, vehicle control device 510 determines, for each vehicle traveling in the adjacent right lane, whether a longitudinal vehicle position Yrl [m] relative to vehicle 100 is positive (i.e., in front of vehicle 100) and is less than a nearest forward position Yref (0<Yrl<Yref).

Then, when 0<Yrl<Yref is satisfied, vehicle control device 510 proceeds to step S4083 and sets the nearest forward position Yref to the value of the longitudinal vehicle position Yrl.

That is, when the longitudinal vehicle position Yrl being processed is smaller than the previous nearest forward position Yref, the nearest forward position Yref is updated to the value of the longitudinal vehicle position Yrl.

The initial value of the nearest forward position Yref (Yref>0) is set at a sufficiently large value when the process proceeds from step S4070 to step S4080, and the nearest forward position Yref is sequentially updated to the smallest value while step S4080 is repeated.

As a result, the longitudinal vehicle position Yrl of a vehicle, which is traveling in front of vehicle 100 and closest to vehicle 100 among vehicles traveling in the adjacent right lane, is set as the nearest forward position Yref.

On the other hand, when 0<Yrl<Yref is not satisfied, vehicle control device 510 proceeds to step S4082 and determines whether the longitudinal vehicle position Yrl [m]

is negative (i.e., behind vehicle 100) and is greater than a nearest backward position Yreb (Yreb<Yrl<0).

Then, when Yreb<Yrl<0 is satisfied, vehicle control device 510 proceeds to step S4084 and sets the nearest backward position Yreb to the value of the longitudinal vehicle position Yrl.

That is, when the longitudinal vehicle position Yrl being processed is greater than the previous nearest backward position Yreb (or less as an absolute value), the nearest backward position Yreb is updated to the value of the longitudinal vehicle position Yrl.

The initial value of the nearest backward position Yreb (Yreb<0) is set at a sufficiently small value (or a large value as an absolute value) when the process proceeds from step S4070 to step S4080, and the nearest backward position Yreb is sequentially updated to the largest value (or the smallest value as an absolute value) while the process of step S4080 is repeated.

As a result, the longitudinal vehicle position Yrl of a vehicle, which is traveling behind vehicle 100 and closest to vehicle 100 among vehicles traveling in the adjacent right lane, is set as the nearest backward position Yreb.

When the longitudinal vehicle position Ytg satisfies neither 0<Ytg<Yref nor Yreb<Ytg<0, vehicle control device 510 ends the process without updating the nearest forward position Yref and the nearest backward position Yreb.

Figure 13:
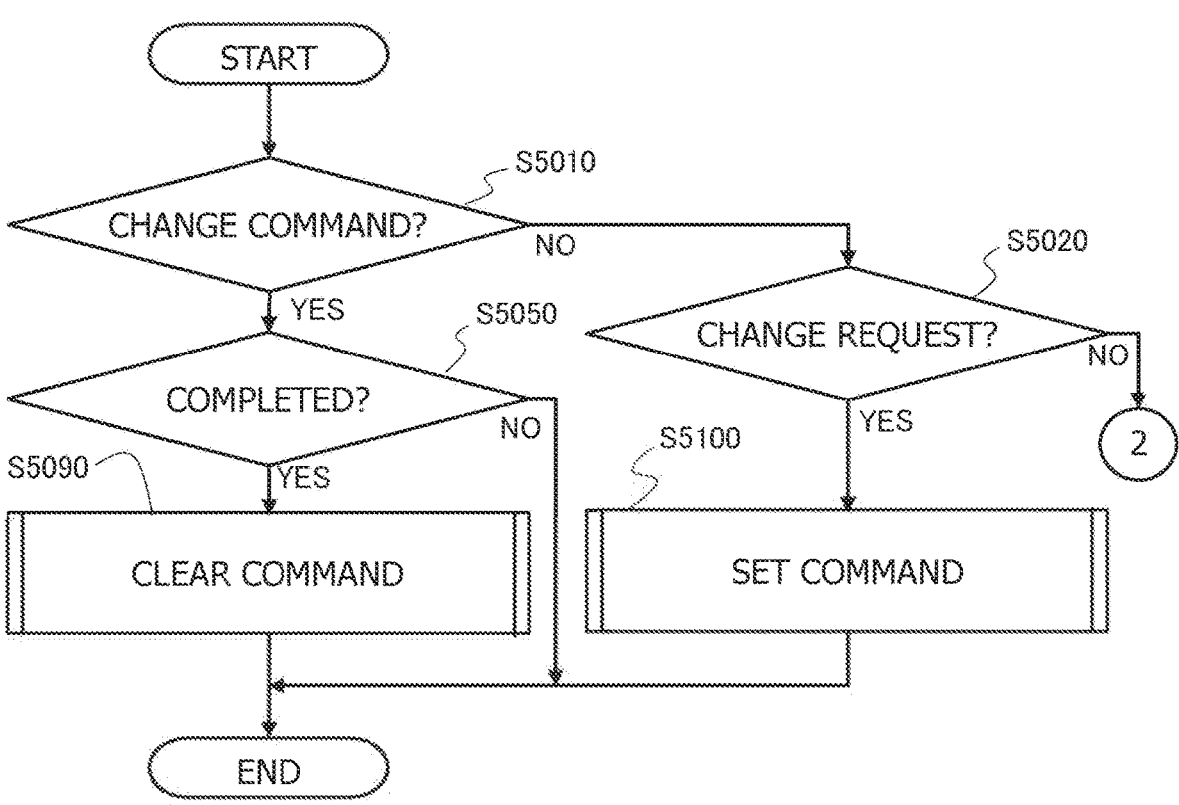
FIG. 13 is a flowchart illustrating a process of determining a driving state.
Figure 14:
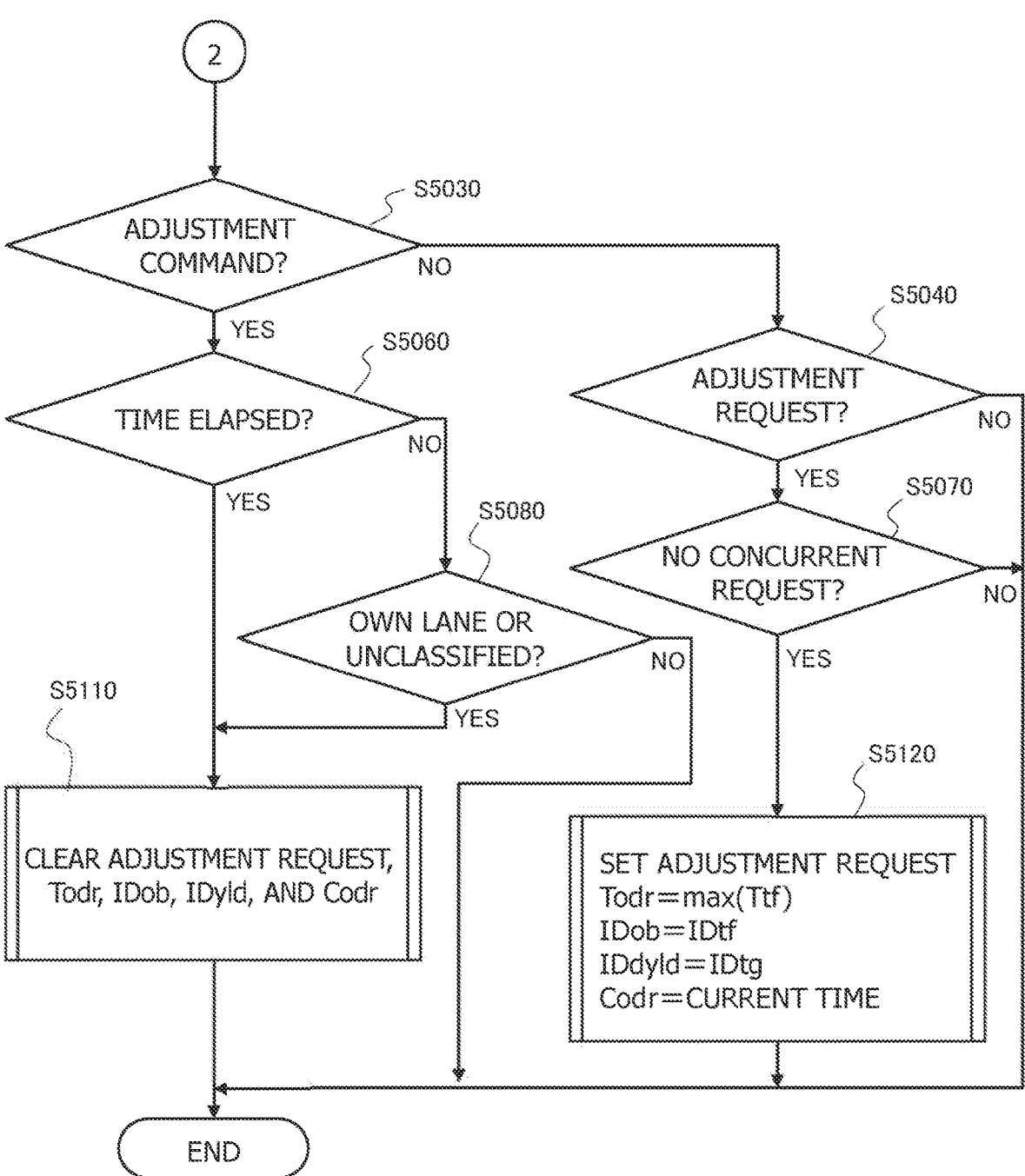
FIG. 14 is a flowchart illustrating a process of determining a driving state.

FIGS. 13 and 14 are flowcharts illustrating the details of the driving condition determination process at step S5000 in FIG. 2.

First, at step S5010, vehicle control device 510 determines whether a lane change command has been set. When no lane change command has been set, vehicle control device 510 proceeds to step S5020 and determines whether a lane change request has been set at step S4000.

Then, when the lane change request has been set, vehicle control device 510 proceeds to step S5100, sets a lane change command, and outputs a command (driving action command) to traveling path control device 530 to request traveling path control device 530 to change the driving lane of vehicle 100 to the adjacent right lane.

When receiving the lane change command, traveling path control device 530 calculates a target traveling path for changing the driving lane of vehicle 100 to the adjacent right lane, calculates a target steering angle to cause vehicle 100 to travel along the calculated target traveling path, and outputs a control command indicating the target steering angle to steering control device 560.

Then, steering control device 560 changes the steering angle of steering device 630 according to the control command indicating the target steering angle to cause vehicle 100 to make a lane change to the adjacent right lane.

When vehicle 100 makes a lane change to the adjacent right lane, an empty space is generated in the previous lane, and the subject vehicle β can make a lane change toward the empty space. This makes it easier for the subject vehicle β to make a lane change, and makes it possible to prevent the driving safety of vehicle 100 from being compromised due to an aggressive lane change of the subject vehicle β to the driving lane of vehicle 100.

Also, when determining at step S5010 that the lane change command has been set, vehicle control device 510 proceeds to step S5050 and determines whether a lane change completion report has been received from traveling path control device 530, i.e., whether a lane change to make way for the high-stress vehicle has been completed.

Traveling path control device 530 is configured to perform a lane change control upon receiving the lane change command from vehicle control device 510 and to send a lane change completion report to vehicle control device 510 when the lane change of vehicle 100 is completed.

When receiving the lane change completion report from traveling path control device 530, vehicle control device 510 proceeds to step S5090 to clear the lane change command and ends the process.

In contrast, when the lane change command has been set but the lane change completion report has not been received, that is, when the lane change control is in progress based on the lane change command, vehicle control device 510 bypasses step S5090 and ends the process to maintain the state in which the lane change command is set.

Also, when determining at step S5020 that the lane change request has not been set, vehicle control device 510 proceeds to step S5030 and determines whether an inter-vehicle time adjustment command has been set.

Then, when the inter-vehicle time adjustment command has not been set, vehicle control device 510 proceeds to step S5040 and determines whether an inter-vehicle time adjustment request has been set.

When both of the lane change request and the inter-vehicle time adjustment request have not been set, vehicle control device 510 ends the process because it is not necessary to change the driving state of vehicle 100 to make way for the high-stress vehicle.

In contrast, when the inter-vehicle time adjustment request has been set, vehicle control device 510 proceeds to step S5070, and determines whether both of the inter-vehicle time adjustment request for the adjacent right lane and the inter-vehicle time adjustment request for the adjacent left lane have been set, that is, whether a high-stress vehicle is present in each of the adjacent right lane and the adjacent left lane and inter-vehicle time adjustments have been requested for both of the lanes.

Here, if vehicle 100 performs inter-vehicle time adjustments when both of the inter-vehicle time adjustment request for the adjacent right lane and the inter-vehicle time adjustment request for the adjacent left lane are set, the high-stress vehicle traveling in the adjacent right lane and the high-stress vehicle traveling in the adjacent left lane may cut into the own lane concurrently and may compromise the driving safety in the own lane.

Therefore, when both of the inter-vehicle time adjustment request for the adjacent right lane and the inter-vehicle time adjustment request for the adjacent left lane have been set, vehicle control device 510 ends the process without setting the inter-vehicle time adjustment command.

That is, when a high-stress vehicle exists in each of the adjacent right lane and the adjacent left lane, vehicle control device 510 does not make way for either one of the high-stress vehicles to prevent lane changes to the own lane from being performed concurrently from the right and left lanes.

With this configuration, although lane change demands of high-stress vehicles are not satisfied, it is possible to prevent the driving safety in the own lane from being compromised due to concurrent lane changes.

In contrast, when either one of the inter-vehicle time adjustment request for the adjacent right lane and the inter-vehicle time adjustment request for the adjacent left lane has been set, vehicle control device 510 proceeds to step S5120 and sets the inter-vehicle time adjustment command.

Also, at step S5120, vehicle control device 510 sets Todr (Todr=max (Ttf)) to the largest inter-vehicle time Ttf from vehicle 100 to the leading vehicle γ in front of the high-stress vehicle among inter-vehicle times Ttf calculated for respective sets of nearby vehicle data at step S4000.

Also, at step S5120, vehicle control device 510 sets IDob to IDtf that is the tracking data ID of the leading vehicle γ attached to the data with the largest inter-vehicle time Ttf, and sets IDyld to IDtg that is the tracking data ID of the subject vehicle β that is a high-stress vehicle.

Furthermore, at step S5120, vehicle control device 510 stores, as Codr, the time when the inter-vehicle time adjustment command is set.

Based on Todr, IDob, and IDyld obtained at step S5120, vehicle control device 510 obtains a follow-target vehicle to be followed by vehicle 100 and a target inter-vehicle time so that the lane change space Yspc for the target high-stress vehicle is secured, and outputs the follow-target vehicle and the target inter-vehicle time to speed control device 520 as an inter-vehicle time adjustment command.

Speed control device 520 calculates a target acceleration based on the follow-target vehicle and the target inter-vehicle time received from vehicle control device 510, sets a braking command and/or a drive command for achieving the target acceleration, and outputs the one or more set commands to braking control device 540 and/or drive control device 550.

For example, in the vehicle driving conditions as illustrated in FIG. 11, vehicle control device 510 switches the follow-target vehicle in the vehicle-following driving control of vehicle 100 to the leading vehicle γ in front of the subject vehicle β so that the subject vehicle β, which is a high-stress vehicle and traveling in the adjacent left lane, can make a lane change and cut in front of vehicle 100, and sets the inter-vehicle time between vehicle 100 and the leading vehicle γ so that a lane change space for the subject vehicle β is secured.

In the vehicle driving conditions in FIG. 11, when the speed of the leading vehicle in front of vehicle 100 is faster than the speed of the leading vehicle γ in front of the subject vehicle β, the leading vehicle in front of vehicle 100 will overtake the subject vehicle β and the leading vehicle γ. In this case, if vehicle 100 follows the leading vehicle, it becomes difficult for the subject vehicle β to cut in front of vehicle 100; and if the subject vehicle β forces a cut-in maneuver, it may compromise the driving safety of vehicle 100.

Therefore, vehicle control device 510 sets the leading vehicle γ in front of the subject vehicle β as a follow-target vehicle and sets a sufficiently long inter-vehicle time in the vehicle-following driving to facilitate a cut-in maneuver and make it easier for the subject vehicle β to cut in front of vehicle 100.

This enables the subject vehicle β to perform a cut-in maneuver in a condition in which a cut-in maneuver is easy and thereby makes it possible to maintain the driving safety of vehicle 100 against the cut-in maneuver of subject vehicle β.

After the subject vehicle β cuts in front of vehicle 100 from an adjacent lane, vehicle control device 510 can set the cut-in subject vehicle β as a target of the vehicle-following driving, change the target inter-vehicle distance back to a normal target inter-vehicle distance in the vehicle-following driving, and cause vehicle 100 to follow the leading vehicle (cut-in vehicle).

When vehicle control device 510 proceeds to step S5030 after setting the inter-vehicle time adjustment command, vehicle control device 510 determines that the inter-vehicle time adjustment command has been set and proceeds to step S5060.

At step S5060, vehicle control device 510 determines whether the elapsed time from the time Codr, at which the inter-vehicle time adjustment command is set, is greater than or equal to a predetermined time.

Then, when the elapsed time from the time Codr, at which the inter-vehicle time adjustment command is set, is greater than or equal to the predetermined time, vehicle control device 510 proceeds to step S5110 and clears the inter-vehicle time adjustment command, IDyld, IDob, Todr and Codr.

That is, when the high-stress vehicle (IDtg) did not make a lane change for the predetermined time or more after vehicle 100 performs an operation to make way for the high-stress vehicle (IDtg), vehicle control device 510 presumes that the high-stress vehicle (IDtg) has no intention to make a lane change and cancels the inter-vehicle time adjustment command to return to a normal leading-vehicle following control.

The predetermined time, which is compared at step S5060 with the elapsed time from the time Codr at which the inter-vehicle time adjustment command is set, is set based on a normal time necessary for the high-stress vehicle (IDtg) having an intention to make a course change to complete the course change (lane change) after the lane change space is secured.

As described above, setting an expiration time of the inter-vehicle time adjustment command makes it possible to prevent unnecessarily continuing a state in which vehicle 100 travels with an inter-vehicle distance longer than usual.

On the other hand, when the elapsed time from the time Codr, at which the inter-vehicle time adjustment command is set, has not reached the predetermined time, vehicle control device 510 proceeds from step S5060 to step S5080.

At step S5080, vehicle control device 510 determines whether one of a first condition and a second condition is satisfied or both of the first condition and the second condition are not satisfied. The first condition indicates that the driving lane of the high-stress vehicle (IDyld) to which the right-of-way is to be given has been changed from the adjacent right lane or the adjacent left lane to the own lane. The second condition indicates that the driving lane of the high-stress vehicle (IDyld) has gone into a state (lane-unclassified state) in which the driving lane does not correspond to any one of the adjacent right lane, the adjacent left lane, and the own lane.

For example, the state in which the driving lane of the high-stress vehicle (IDyld) does not correspond to any one of the adjacent right lane, the adjacent left lane, and the own lane includes a case in which vehicle 100 is traveling in the rightmost lane in a road with three lanes in each direction and the high-stress vehicle (IDyld) traveling in the center lane has made a lane change to the leftmost lane, and a case in which the high-stress vehicle (IDyld) traveling in a left turn lane has moved away from vehicle 100.

Here, when both of the first condition and the second condition are not satisfied and it is presumed that the high-stress vehicle (IDyld) to which the right-of-way is to be given is still traveling in the same lane in the same direction as vehicle 100, vehicle control device 510 ends the process and retains the inter-vehicle time adjustment command.

In contrast, when one of the first condition and the second condition is satisfied, that is, when the high-stress vehicle (IDyld) has made a lane change to the own lane and the purpose of the driving action to make way for the high-stress vehicle (IDyld) has been achieved, or when the high-stress vehicle (IDyld) has made a lane change to a lane other than the own lane and vehicle 100 no longer needs to make way for the high-stress vehicle (IDyld), vehicle control device 510 proceeds to step S5110 and clears the inter-vehicle time adjustment command, IDyld, IDob, Todr and Codr.

As described above, when a high-stress vehicle is detected in the adjacent left lane or the adjacent right lane to the left or right of the own lane while vehicle 100 is traveling on a road with multiple lanes in each direction, vehicle control device 510 is configured to make way for the high-stress vehicle to enable the high-stress vehicle to make a lane change to the own lane. This configuration makes it possible to prevent the high-stress vehicle from influencing the driving of vehicle 100 and thereby makes it possible to improve the driving safety of vehicle 100.

The technical ideas described in the above embodiment may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, vehicle control device 510 may rank the stress levels of high-stress vehicles based on decelerations and inter-vehicle times and preferentially make way for a vehicle with a higher stress level.

Also, vehicle control device 510 may perform the process of setting a high-stress vehicle based also on one of the conditions such as a time for which a vehicle continuously travels in a state in which the inter-vehicle time (or inter-vehicle distance) with the leading vehicle is less than or equal to a predetermined value, a lane-change history, a difference between the average traveling speed of vehicles in the own lane and the average traveling speed of vehicles in an adjacent lane, a difference between the average inter-vehicle time in the own lane and the average inter-vehicle time in an adjacent lane, and a decrease in the number of lanes down the road.

Also, when there is insufficient space for vehicle 100 to make a lane change to a lane to the right of the own lane and it is possible that the deceleration of vehicle 100 to make way for a high-stress vehicle affects the driving of a trailing vehicle, vehicle control device 510 may stop changing the driving state of vehicle 100 to make way for the high-stress vehicle.

Also, when a high-stress vehicle is traveling in an adjacent right lane to the right of the own lane and there is a driving lane to the left of the own lane, vehicle control device 510 may select a lane change to the adjacent left lane as a measure to change the driving state of vehicle 100 to make way for the high-stress vehicle.

Also, when setting the inter-vehicle time adjustment command, vehicle control device 510 may make the target inter-vehicle time longer than normal instead of changing the follow-target vehicle to secure a lane change space for the subject vehicle β (high-stress vehicle) between the leading vehicle and vehicle 100.

Here, vehicle control device 510 may be configured to not change the follow-target vehicle when the speed difference between the speed of the leading vehicle γ in front of the subject vehicle β (high-stress vehicle) and the speed of the leading vehicle in front of vehicle 100 is less than a predetermined speed, and to change the follow-target vehicle to the leading vehicle γ when the speed difference is greater than the predetermined speed.

The above embodiment is based on an assumption that the road is a left-hand traffic road. However, the process of setting a high-stress vehicle and the process of changing the driving state of vehicle 100 to make way for the high-stress vehicle may also be performed on a road on which traffic drives on the right. In the case of a road on which traffic drives on the right, for example, the lane change of vehicle 100 to make way for a high-stress vehicle is basically performed from the own lane to the adjacent left lane.

<div align="center">REFERENCE SYMBOL LIST</div>

100 vehicle
200 vehicle control system
300 surrounding environment recognition unit
310 laser scanning device
320 camera device
330 millimeter-wave radar device
340 surrounding environment recognition device
400 driving state detection unit
410 wheel speed sensor
420 acceleration sensor
500 control unit
510 vehicle control device (control unit, controller)
520 speed control device
530 traveling path control device
540 braking control device
550 drive control device
560 steering control device
600 actuator unit
610 braking device
620 drive device
630 steering device

The invention claimed is:

1. A vehicle control device provided in a vehicle including a surrounding environment recognition unit which recognizes other vehicles traveling around the vehicle and driving lanes around the vehicle, the vehicle control device comprising:

a control unit that performs a calculation based on input information and outputs a calculation result, wherein the control unit is configured to calculate:

based on information obtained from the surrounding environment recognition unit, a first relative distance between a first vehicle traveling, in front of the vehicle, in a second lane adjacent to a first lane in which the vehicle travels and a second vehicle traveling in the second lane in front of the first vehicle;

a relative velocity of the first vehicle relative to the second vehicle, a relative acceleration of the first vehicle relative to the second vehicle;

a second relative distance between the second vehicle and a third vehicle traveling in front of the vehicle in the first lane; and a third relative distance between the first vehicle and the vehicle, determine whether the first vehicle is a high-stress vehicle that is unable to make a lane change despite a lane change request to change from the second lane to the first lane based on a first inter-vehicle time that is based on the first relative distance and the relative velocity, the relative acceleration, and a lane change space that is based on the second relative distance, and output a control command for changing a driving state of the vehicle to make way for the first vehicle which is determined to be the high-stress vehicle, in a case in which the third relative distance is within a predetermined range when the first vehicle is determined to be the high-stress vehicle.

2. The vehicle control device as claimed in claim 1, wherein after setting the first vehicle as the high-stress vehicle, the control unit cancels the setting of the first vehicle as the high-stress vehicle based on the lane change space and a predetermined space.

3. The vehicle control device as claimed in claim 2, wherein when the lane change space is larger than the predetermined space and a predetermined time elapses after the first vehicle is set as the high-stress vehicle, the control unit cancels the setting of the first vehicle as the high-stress vehicle.

4. The vehicle control device as claimed in claim 1, wherein the control unit is configured to:

determine, based on information on obtained from the surrounding environment recognition unit, whether a first condition in which the second lane is to the left of the first lane and a third lane is to the right of the first lane, a second condition in which a second inter-vehicle time between the vehicle and a fourth vehicle traveling in the first lane behind the vehicle is shorter than a predetermined inter-vehicle time, and a third condition in which a fourth relative distance between the vehicle and a fifth vehicle traveling in the third lane in front of the vehicle is longer than a predetermined first distance and a fifth relative distance between the vehicle and a sixth vehicle traveling in the third lane behind the vehicle is longer than the predetermined second distance are satisfied and output the control command to cause the vehicle to make a lane change to the third lane when the first condition, the second condition, and the third condition are satisfied.

5. The vehicle control device as claimed in claim 1, wherein when the second lane is to the right of the first lane, the control unit outputs the control command to adjust a speed of the vehicle.

6. The vehicle control device as claimed in claim 1, wherein when the second lane is to the left of the first lane and the first lane is a rightmost lane, the control unit outputs the control command to adjust a speed of the vehicle.

7. The vehicle control device as claimed in claim 1, wherein when the relative acceleration is greater than a decision threshold based on the inter-vehicle time and the lane change space is within a range between predetermined thresholds, the control unit sets the first vehicle as the high-stress vehicle.

8. The vehicle control device as claimed in claim 7, wherein the control unit sets the decision threshold at a higher value as the first inter-vehicle time increases.

9. A vehicle control method performed by a controller which is provided in a vehicle including a surrounding environment recognition unit which recognizes other vehicles traveling around the vehicle and driving lanes around the vehicle the method comprising:

calculating based on information obtained from the surrounding environment recognition unit, a first relative distance between a first vehicle traveling, in front of the vehicle, in a second lane adjacent to a first lane in which the vehicle travels and a second vehicle traveling in the second lane in front of the first vehicle;

a relative velocity of the first vehicle relative to the second vehicle;

a relative acceleration of the first vehicle relative to the second vehicle;

a second relative distance between the second vehicle and a third vehicle traveling in front of the vehicle in the first lane, and a third relative distance between the first vehicle and the vehicle, determining whether the first vehicle is a high-stress vehicle that is unable to make a lane change despite a lane change request to change from the second lane to the first lane based on a first inter-vehicle time that is based on the first relative distance and the relative velocity, the relative acceleration, and a lane change space that is based on the second relative distance; and outputting a control command for changing a driving state of the vehicle to make way for the first vehicle which is determined to be the high-stress vehicle, in a case in which the third relative distance is within a predetermined range when the first vehicle is determined to be the high-stress vehicle.

10. A vehicle control system comprising:

a braking device provided in a vehicle;

a drive device provided in the vehicle;

a steering device provided in the vehicle; and a surrounding environment recognition unit provided in the vehicle and recognizes other vehicles traveling around the vehicle and driving lanes around the vehicle, and a controller provided in the vehicle, that is configured to calculate based on information obtained from the surrounding environment recognition unit, a first relative distance between a first vehicle traveling, in front of the vehicle, in a second lane adjacent to a first lane in which the vehicle travels and a second vehicle traveling in the second lane in front of the first vehicle;

a relative velocity of the first vehicle relative to the second vehicle;

a relative acceleration of the first vehicle relative to the second vehicle;

a second relative distance between the second vehicle and a third vehicle traveling in front of the vehicle in the first lane; and a third relative distance between the first vehicle and the vehicle, determine whether the first vehicle is a high-stress vehicle that is unable to make a lane change despite a lane change request to change from the second lane to the first lane based on a first inter-vehicle time that is based on the first relative distance and the relative velocity, the relative acceleration, and a lane change space that is based on the second relative distance, and output, to at least one of the braking device, the drive device, or the steering device, a control command for changing a driving state of the vehicle to make way for the first vehicle which is determined to be the high-stress vehicle, in a case in which the third relative distance is within a predetermined range when the first vehicle is determined to be the high-stress vehicle.

* * * * *